(12) United States Patent
Son et al.

(10) Patent No.: US 11,940,599 B2
(45) Date of Patent: Mar. 26, 2024

(54) OPTICAL IMAGING SYSTEM

(71) Applicant: SAMSUNG ELECTRO-MECHANICS CO., LTD., Suwon-si (KR)

(72) Inventors: Ju Hwa Son, Suwon-si (KR); Jong Gi Lee, Suwon-si (KR); Hyo Jin Hwang, Suwon-si (KR); Sang Hyun Jang, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 587 days.

(21) Appl. No.: 17/004,317

(22) Filed: Aug. 27, 2020

(65) Prior Publication Data

US 2021/0063701 A1   Mar. 4, 2021

(30) Foreign Application Priority Data

Aug. 30, 2019   (KR) .................. 10-2019-0107270

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01); *G02B 13/0065* (2013.01)

(58) Field of Classification Search
CPC ............ G02B 13/0045; G02B 13/0065; G02B 13/009; G02B 9/62; G02B 17/023; G02B 2207/117; G02B 5/04; G02B 6/425; F05B 2270/804
See application file for complete search history.

(56) References Cited

U.S. PATENT DOCUMENTS

| 6,867,933 B2 * | 3/2005 | Matsusaka .......... G02B 13/006 |
| | | 348/335 |
| 8,294,780 B2 | 10/2012 | Chang |
| 9,857,563 B2 | 1/2018 | Liao et al. |
| 9,989,741 B1 * | 6/2018 | Hsueh ...................... G02B 9/60 |
| 10,175,458 B2 | 1/2019 | Tseng et al. |

(Continued)

FOREIGN PATENT DOCUMENTS

| CN | 101771816 A | 7/2010 |
| CN | 109960005 A | 7/2019 |

(Continued)

OTHER PUBLICATIONS

Korean Office Action dated May 25, 2022, in counterpart Korean Patent Application No. 10-2020-0109412 (5 pages in English and 4 pages in Korean).

(Continued)

*Primary Examiner* — Marin Pichler
*Assistant Examiner* — Justin W. Hustoft
(74) *Attorney, Agent, or Firm* — NSIP Law

(57) ABSTRACT

An optical imaging system includes a first lens having a convex image-side surface, a second lens having a concave object-side surface, a third lens, a fourth lens, and a fifth lens disposed sequentially from an object side. The optical imaging system satisfies $4.8<f/IMG\_HT<9.0$, where f is a focal length of the optical imaging system, and IMG_HT is half a diagonal length of an imaging surface of an image sensor.

13 Claims, 39 Drawing Sheets

(56) References Cited

U.S. PATENT DOCUMENTS

| | | |
|---|---|---|
| 10,802,251 B2 | 10/2020 | Lin et al. |
| 2008/0106800 A1 | 5/2008 | Shin |
| 2010/0165120 A1* | 7/2010 | Chang .................. H04N 23/45 348/207.99 |
| 2016/0381260 A1* | 12/2016 | Narayanswamy ..... G03B 30/00 348/360 |
| 2017/0299846 A1 | 10/2017 | Lin et al. |
| 2017/0299847 A1 | 10/2017 | Huang |
| 2017/0315334 A1* | 11/2017 | Liao ........................ G02B 9/62 |
| 2018/0024314 A1 | 1/2018 | Tashiro |
| 2018/0059376 A1* | 3/2018 | Lin .................... G02B 13/0065 |
| 2018/0081152 A1 | 3/2018 | Dai et al. |
| 2018/0143403 A1 | 5/2018 | Tseng et al. |
| 2018/0364455 A1 | 12/2018 | Chen et al. |
| 2019/0094500 A1* | 3/2019 | Tseng ................ G02B 13/0045 |
| 2020/0393656 A1 | 12/2020 | Huang et al. |

FOREIGN PATENT DOCUMENTS

| | | |
|---|---|---|
| CN | 110109236 A | 8/2019 |
| KR | 10-0800811 B1 | 2/2008 |
| KR | 10-2018-0103809 A | 9/2018 |
| TW | 1594037 B | 8/2017 |
| TW | 201736898 A | 10/2017 |
| TW | 1613481 B | 2/2018 |
| TW | 1618944 B | 3/2018 |
| TW | 201819974 A | 6/2018 |
| TW | 201830082 A | 8/2018 |
| TW | 1637211 B | 10/2018 |

OTHER PUBLICATIONS

Taiwanese Office Action dated Feb. 24, 2021 issued in the corresponding Taiwanese Patent Application No. 109129607. (6 pages in English)(6 pages in Taiwanese).

Notice of Reason for Rejection dated Nov. 19, 2021, in counterpart Korean Patent Application No. 10-2020-0109412 (8 pages in English and 6 pages in Korean).

Chinese Office Action dated Aug. 25, 2022, in counterpart Chinese Patent Application No. 202010892779.8 (10 Pages in English, 10 Pages in Chinese).

Bi'e, Wu, "Two lenses are no longer enough! Multi-lens technology for smartphones" *North American Intellectual Rights News Editorial Department*, http://www.naipo.com/Portals/1/web_tw/Knowledge_Center/Industry_Economy/IPNC_190327_0705.htm, Mar. 27, 2019, (7 pages in English, 6 pages in Chinese).

Taiwanese Office Action dated Oct. 24, 2023, in counterpart Taiwanese Patent Application No. 112123375 (9 pages in English, 10 pages in Chinese).

Korean Office Action dated Dec. 15, 2023, in counterpart Korean Patent Application No. 10-2023-0035066 (7 pages in English, 6 pages in Korean).

* cited by examiner

OPTICAL IMAGING SYSTEM

CROSS-REFERENCE TO RELATED APPLICATION(S)

This application claims the benefit under 35 USC 119(a) of Korean Patent Application No. 10-2019-0107270 filed on Aug. 30, 2019 in the Korean Intellectual Property Office, the entire disclosure of which is incorporated herein by reference for all purposes.

BACKGROUND

1. Field

This application relates to an optical imaging system configured to fold an optical path.

2. Description of Related Art

In a retractable imaging system in which a plurality of lenses is disposed in a row, an overall length of the optical imaging system is increased as the number of lenses is increased. For example, it may be more difficult to miniaturize an optical imaging system including five lenses than to miniaturize an optical imaging system including three lenses. For this reason, there is a limitation in mounting a retractable optical imaging system in a portable terminal having a low thickness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An optical imaging system which may be mounted in a thinned small-sized terminal while having a long focal length.

In one general aspect, an optical imaging system includes a first lens having a convex image-side surface, a second lens having a concave object-side surface, a third lens, a fourth lens, and a fifth lens disposed sequentially from an object side. The optical imaging system satisfies $4.8 < f/\text{IMG\_HT} < 9.0$, where f is a focal length of the optical imaging system, and IMG_HT is half a diagonal length of an imaging surface of an image sensor.

The optical imaging system may include a sixth lens disposed on an image side of the fifth lens.

An image-side surface of the sixth lens may be convex.

The optical imaging system may include a prism disposed on an object side of the first lens.

The optical imaging system may satisfy $0.04 \text{ mm} < DPL1 < 1.2 \text{ mm}$, where DPL1 is a distance from an image-side surface of the prism to an object-side surface of the first lens.

The optical imaging system may satisfy $0.02 < AL1/(PTTL)^2 < 0.07$, where AL1 is an area in which an effective diameter of the first lens is projected onto an imaging plane, and PTTL is a distance from a reflective surface of the prism to the imaging plane.

The optical imaging system may satisfy $1.0 < PTTL/f < 1.3$, where PTTL is a distance from a reflective surface of the prism to an imaging plane.

An object-side surface of the third lens may be concave.

An object-side surface of the fourth lens may be convex.

The optical imaging system may include a prism disposed between the fifth lens and an imaging plane.

In another general aspect, an optical imaging system includes a first prism, a first lens, a second lens, a third lens, a fourth lens, and a fifth lens disposed sequentially from an object side. The optical imaging system satisfies $0.02 < AL1/(PTTL)^2 < 0.07$, where AL1 is an area in which an effective diameter of the first lens is projected onto an imaging plane, and PTTL is a distance from a reflective surface of the first prism to the imaging plane.

A portable electronic device may include three or more camera modules, wherein an optical axis of a first camera module is formed in a different direction from an optical axis of a second camera module and an optical axis of a third camera module, and the image sensor may be configured to convert light incident through the first to fifth lenses to an electrical signal.

The first camera module may have the narrowest angle of view and the longest focal length, the third camera module may have the widest angle of view and the shortest focal length, and the second camera module may have a wider angle of view than the first camera module and a narrower angle of view than the third camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
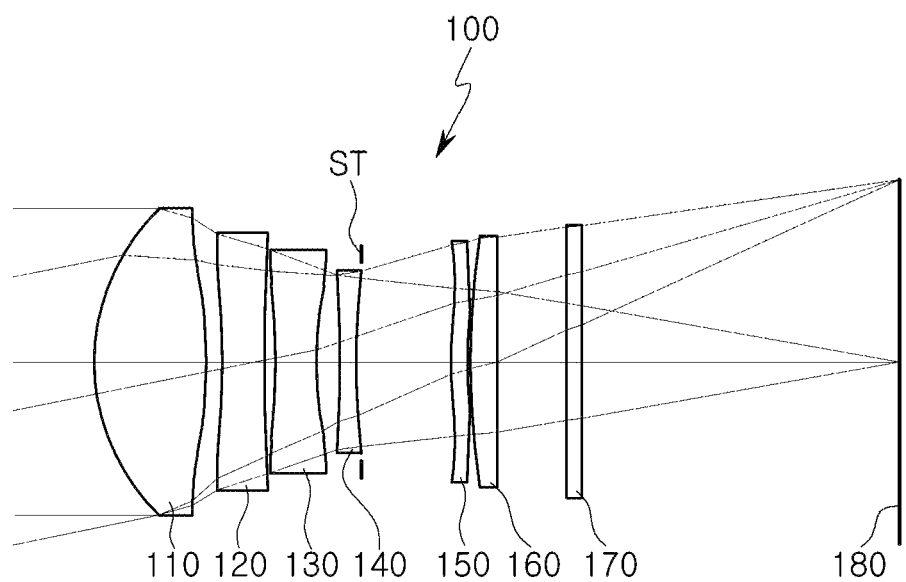
FIG. 1 illustrates a configuration of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the examples, a first lens refers to a lens most adjacent to an object, and a fifth or sixth lens refers to a lens most adjacent to an image-side surface (or an image sensor). In the examples, a unit of a radius of curvature, a thickness, a distance from an object-side surface to an image-side surface of a first lens (TTL), a half of a diagonal length of an image-side surface (IMG HT), and a focal length are indicated in millimeters (mm). A thickness of a lens, a gap between lenses, and a TTL refer to a distance of a lens taken in an optical axis direction. Also, in the descriptions of a shape of a lens, a configuration in which one surface is convex indicates that a paraxial region of the surface is convex, and a configuration in which one surface is concave indicates that a paraxial region of the surface is concave. Thus, even when one surface of a lens is described as being convex, an edge of the lens may be concave. Similarly, even when one surface of a lens is described as being concave, an edge of the lens may be convex.

An optical imaging system includes an optical system including a plurality of lenses. For example, the optical system of the optical imaging system may include lenses having refractive power. However, the optical imaging system is not limited to including only the lenses having refractive power. For example, the optical imaging system may include a prism, refracting incident light, and a stop for controlling the amount of light. In addition, the optical imaging system may include an infrared cut-off filter for cutting off infrared light. The optical imaging system may further include an image sensor (for example, an imaging device) for converting an image of a subject, incident thereto through the optical system, into an electrical signal. The optical imaging system may further include a gap maintaining member for adjusting a gap between lenses.

The lenses are formed of a material having a refractive index different from a refractive index of air. For example, the lenses are formed of plastic or glass. At least one of the lenses has an aspherical shape. An aspherical surface of each of the lenses is represented by Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

In Equation 1, c denotes an inverse of a radius of curvature of a corresponding lens, k denotes a conic constant, r denotes a distance from a certain point on an aspherical surface of the lens to an optical axis, A to J denote aspherical constants, and Z (or SAG) denotes a height in an optical axis direction from the certain point on the aspherical surface to a vertex of the aspherical surface.

The optical imaging system includes five or more lenses. For example, the optical imaging system includes a first lens, a second lens, a third lens, a fourth lens, and a fifth lens, sequentially arranged from an object side. The optical imaging system may further include a sixth lens, as necessary.

The first to fifth/sixth lenses may be disposed at intervals from adjacent lenses. For example, an image-side surface of the first lens is not in contact with an object-side surface of the second lens, and an image-side surface of the second lens is not in contact with an object-side surface of the third lens.

The first lens has predetermined refractive power. For example, the first lens may have positive refractive power. The first lens has a shape at least one surface is convex. For example, the object-side surface and the image-side surface of the first lens may be convex. The first lens has a predetermined refractive index. For example, the first lens may have a refractive index of 1.2 or to 1.56 or less. The first lens has a predetermined focal length. For example, the focal length of the first lens may be determined in the range of 3.0 to 8.0 mm.

The second lens has predetermined refractive power. For example, the second lens may have positive or negative refractive power. The second lens has a shape in which one surface is convex or both surfaces are concave. For example, the second lens may have a shape in which an image-side surface is convex or both an object-side surface and the image-side surface are concave. The second lens has a predetermined refractive index. For example, the second lens may have a refractive index of 1.6 or more to 2.0 or less.

The third lens has predetermined refractive power. For example, the third lens may have negative refractive power. The third lens has a shape in which at least one surface is concave. For example, the third lens may have a shape in which an object-side surface and an image-side surface of the third lens are concave. The third lens has a predetermined refractive index. For example, the third lens may have a refractive index of 1.5 or more to 1.8 or less. The third lens has a predetermined focal length. For example, the focal length of the third lens may be determined in the range of −20.0 to −2.0 mm.

The fourth lens has predetermined refractive power. For example, the fourth lens may have positive or negative refractive power. The fourth lens has a shape in which one surface is convex. For example, the fourth lens may have a shape in which an object-side surface is convex. The fourth lens has a predetermined refractive index. For example, the fourth lens may have a refractive index of 1.6 or more to 2.0 or less.

The fifth lens has predetermined refractive power. For example, the fifth lens may have positive or negative refractive power. The fifth lens has a concave shape. For example, the fifth lens may have a concave shape on an object-side surface or an image-side surface. The fifth lens has a predetermined refractive index. For example, the fifth lens may have a refractive index of 1.5 or more to 1.8 or less.

The sixth lens has predetermined refractive power. For example, the sixth lens may have positive or negative refractive power. The sixth lens has a shape in which one surface is convex. For example, the sixth lens may have a shape in which an image-side surface is convex. The sixth lens has a predetermined refractive index. For example, the fifth lens may have a refractive index of 1.5 or more to 1.8 or less.

At least one of the first to sixth lenses may have a shape in which an effective diameter in a first direction, intersecting an optical axis, and an effective diameter in a second direction are different from each other. For example, an effective diameter of the first lens in a horizontal direction may be different from an effective diameter of the first lens in a vertical direction.

The optical imaging system includes a lens formed of plastic. For example, at least one of the five or more lenses, constituting a lens group of the optical imaging system, may be formed of plastic.

The optical imaging system includes an aspherical lens. For example, at least one of five or more lenses, constituting a lens group of the optical imaging system, may be an aspherical lens.

The optical imaging system includes a member configured to fold or refract an optical path. For example, the optical imaging system may include a prism. The prism is disposed on the object-side surface of the first lens. The prism may be generally formed of a material having a low Abbe number. For example, the prism may be selected from materials, each having an Abbe number of 30 or less.

The optical imaging system includes a filter, a stop, and an image sensor.

The filter is disposed between a lens, disposed to be closest to an imaging plane, and an image sensor. The filter may cut off a portion of wavelengths from incident light to improve a resolution of the optical imaging system. For example, the filter may cut off an infrared wavelength of the incident light. The stop is disposed between the prism and the fourth lens group or the fifth lens group.

The optical imaging system includes a gap maintaining member.

The gap maintaining member may be disposed between one lens and another lens. For example, the gap maintaining member may be disposed between the first lens and the second lens. A hole is formed in the center of the gap holding member. The hole may have a shape having a major axis and a minor axis. For example, the hole may have a shape of an ellipse, a rectangle having rounded corners, or the like. A length of the hole in a minor axis direction may have a size of 0.7 or more to less than 1.0, as compared with a length of the hole in a major axis direction.

The optical imaging system may satisfy one or more conditional expressions among Conditional Expressions.

Conditional Expression: $0.65 < L1S1es/L1S1el < 1.0$
Conditional Expression: $0.65 < L1S2es/L1S2el < 1.0$
Conditional Expression: $0.65 < L2S1es/L2S1el < 1.0$
Conditional Expression: $0.65 < L2S2es/L2S2el < 1.0$
Conditional Expression: $0.04 mm < DPL1 < 1.2 mm$
Conditional Expression: $12 mm < PTTL < 28 mm$
Conditional Expression: $0.65 < SPY2/SPX2 < 1.0$
Conditional Expression: $0.7 < L1S1el/IMG\_HT < 1.6$
Conditional Expression: $0.09 < L1S1el/PTTL < 0.16$
Conditional Expression: $0.06 < L1S1es/PTTL < 0.12$
Conditional Expression: $0.07 < L2S1el/PTTL < 0.14$
Conditional Expression: $0.05 < L2S1es/PTTL < 0.10$
Conditional Expression: $0.02 < AL1/(PTTL)^2 < 0.07$
Conditional Expression: $80° < 2\theta 0 < 92°$
Conditional Expression: $3.0 < 2\theta/FOV < 8.0$
Conditional Expression: $0.1 < BFL/2IMG\_HT < 3.0$ In the above conditional expressions, L1S1es denotes a minor axis effective radius of the object-side surface of the first lens, L1S1el denotes a major axis effective radius of the object-side surface of the first lens, L1S2es denotes a minor axis effective radius of the image-side surface of the first lens, and L1S2el denotes a major axis effective radius of the image-side surface of the first lens, L2S1es denotes a minor axis effective radius of the object-side surface of the second lens, L2S1el denotes a major axis effective radius of the object-side surface of the second lens, and L2S2es denotes a minor axis effective radius of the image-side surface of the second lens, L2S2el denotes a major axis effective radius of the image-side surface of the second lens, DPL1 denotes a distance from an image-side surface of the prism to the object-side surface of the first lens, PTTL denotes a distance from a reflective surface of the prism to an image surface, SPY2 denotes a length of a hole, formed in the gap maintaining member, in a minor axis direction, SPX2 denotes a length of the hole, formed in the gap maintaining member, in a major axis direction, AD denotes an area in which an effective diameter of the first lens (the object-side surface) is projected onto the imaging plane, $2\theta$ denotes an angle formed by a center of an optical axis of a lens and both ends of a linear portion of an effective diameter of the lens, FOV denotes an overall viewing angle of the optical imaging system, and BFL denotes a distance from an image-side surface of a lens, closest to the imaging plane, to the imaging plane. IMG HT is half a diagonal length of the imaging surface of the image sensor.

Hereinafter, optical imaging systems according to various examples will be described.

An optical imaging system according to a first example will be described with reference to FIGS. 1 and 2.

An optical imaging system 100 includes a prism P, a first lens 110, a second lens 120, a third lens 130, a fourth lens 140, a fifth lens 150, and a sixth lens 160.

The first lens 110 has positive refractive power. The first lens 110 has a shape in which an object-side surface is convex and an image-side surface is convex. The second lens 120 has negative refractive power. The second lens 120 has a shape in which an object-side surface is concave and an image-side surface is convex. The third lens 130 has negative refractive power. The third lens 130 has a shape in which an object-side surface is concave and an image-side surface is concave. The fourth lens 140 has negative refractive power. The fourth lens 140 has a shape an object-side surface is convex and an image-side surface is concave. The fifth lens 150 has negative refractive power. The fifth lens 150 has a shape in which an object-side surface is convex and an image-side surface is concave. The sixth lens 160 has positive refractive power. The sixth lens 160 has a shape in which an object-side surface is convex and an image-side surface is convex.

The optical imaging system 100 includes a prism P, a stop ST, a filter 170, and an image sensor 180.

Figure 2:
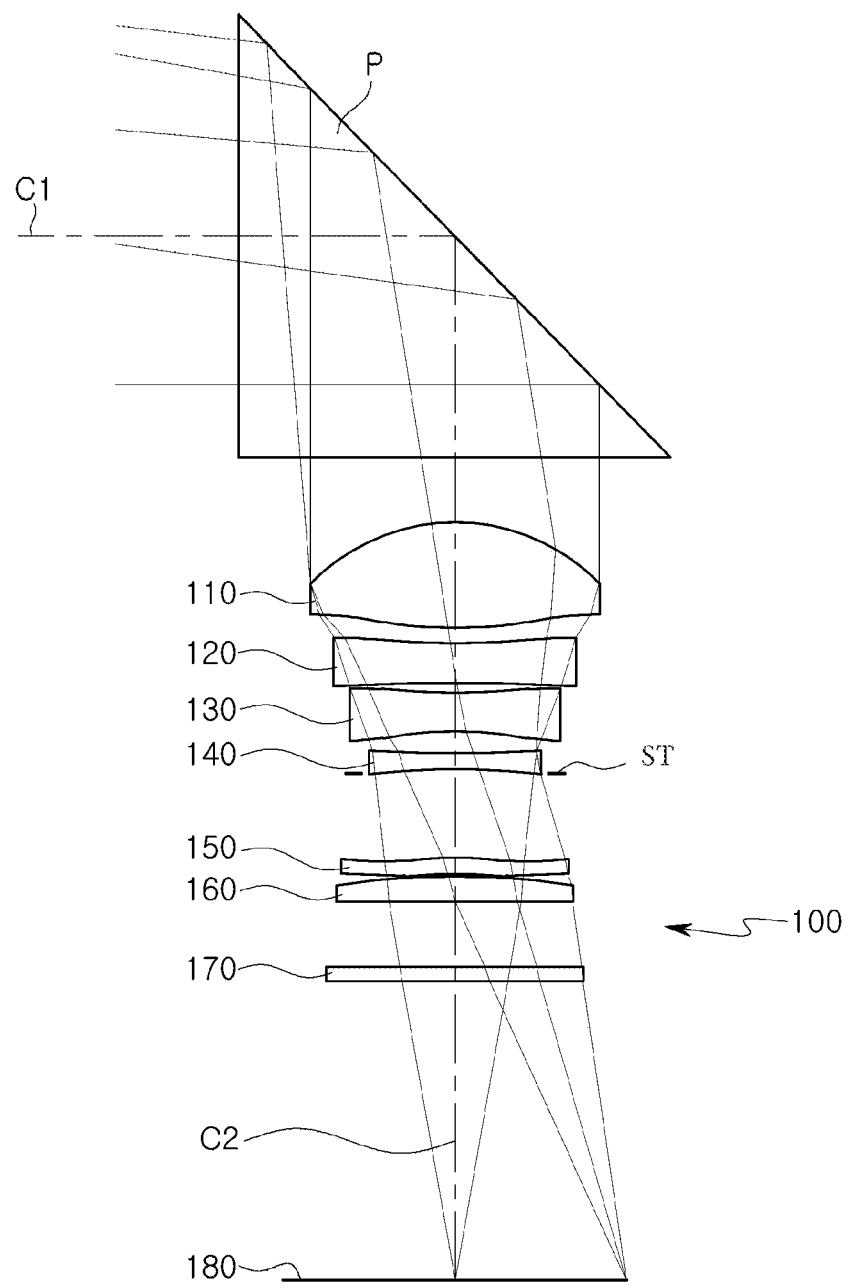
FIG. 2 illustrates a configuration of an optical imaging system including a prism in FIG. 1.

The optical imaging system includes the prism P as a means for folding or refracting an optical path, as illustrated in FIG. 2. The prism P folds light, incident on the first optical axis C1, in a direction of the second optical axis C2. The second optical axis C2, folded by the prism P, may have a substantially right angle to the first optical axis C1. The prism P is disposed on the object-side of the first lens 110. The above-described prism P refracts light, reflected from an object (a subject), to the image sensor 180.

The filter 170 is disposed in front of the image sensor 180 to cut off infrared rays, or the like, included in the incident light. The image sensor 180 includes a plurality of optical sensors. The above-configured image sensor 180 is configured to convert an optical signal into an electrical signal.

Figure 3:
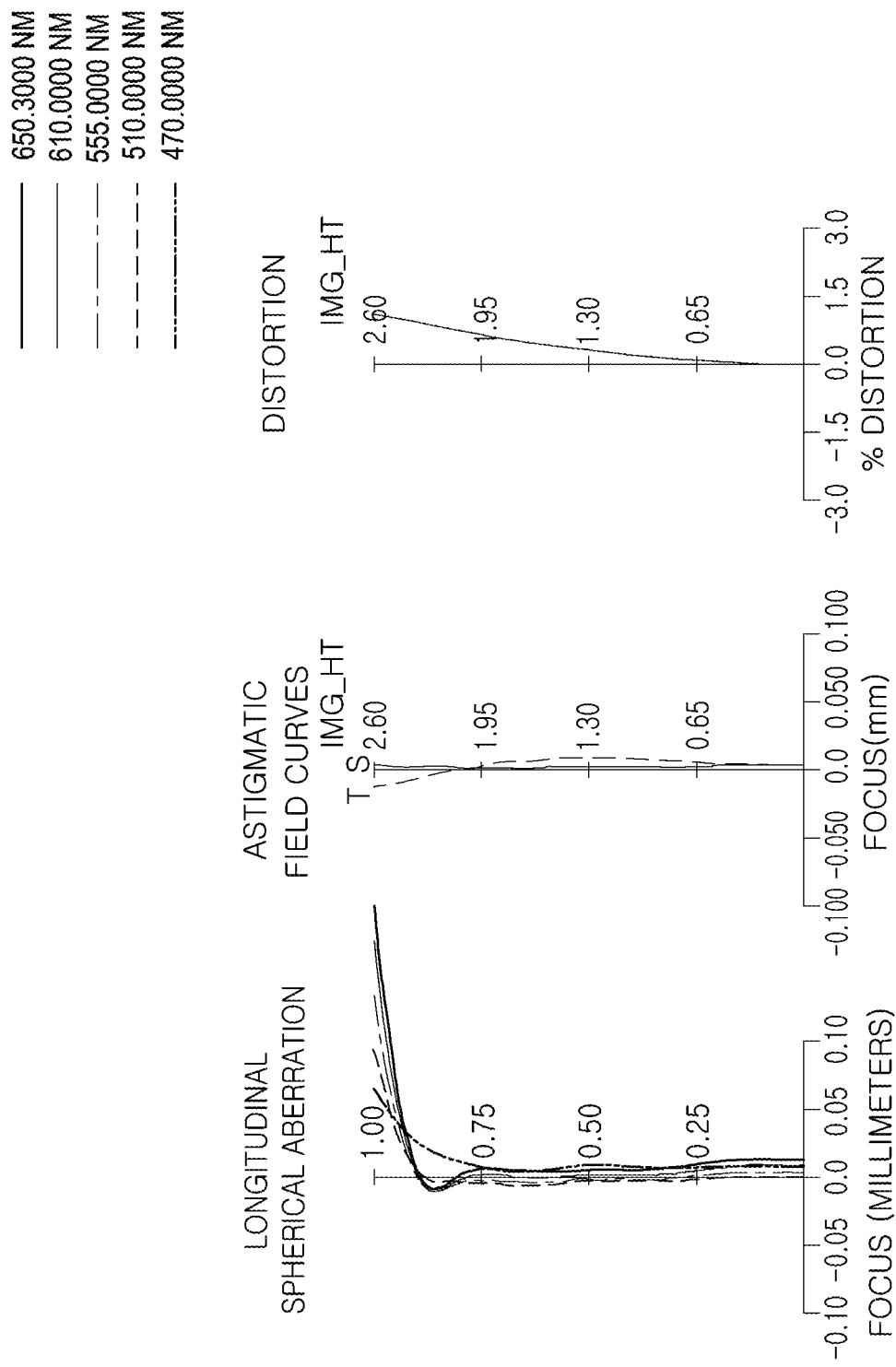
FIG. 3 is aberration curves of the optical imaging system illustrated in FIG. 1.

Table 1 shows lens characteristics of the optical imaging system according to this example, and Table 2 shows aspherical values of the optical imaging system according to this example. FIG. 3 is aberration curves of the above-configured optical imaging system 100.

TABLE 1

| Surface No. | Remark | Radius of Curvature | Thickness/ Distance | Refractive Index | Abbe Number | Focal Length |
|---|---|---|---|---|---|---|
| S1 | Prism | infinity | 3.4000 | 1.722 | 29.500 | |
| S2 | | infinity | 3.4000 | 1.722 | 29.500 | |
| S3 | | infinity | 1.0000 | | | |
| S4 | First Lens | 2.8996 | 1.6209 | 1.536 | 55.656 | 3.855 |

TABLE 1-continued

| Surface No. | Remark | Radius of Curvature | Thickness/ Distance | Refractive Index | Abbe Number | Focal Length |
|---|---|---|---|---|---|---|
| S5 | | −5.7866 | 0.2411 | | | |
| S6 | Second | −7.1840 | 0.6253 | 1.667 | 20.353 | −13.184 |
| S7 | Lens | −40.6264 | 0.1424 | | | |
| S8 | Third | −5.5773 | 0.5850 | 1.546 | 56.114 | −5.167 |
| S9 | Lens | 5.9191 | 0.3450 | | | |
| S10 | Fourth | 28.2367 | 0.2300 | 1.667 | 20.353 | −15.794 |
| S11 (STOP) | Lens | 7.6465 | 1.3962 | | | |
| S12 | Fifth Lens | 7.1327 | 0.2300 | 1.536 | 55.656 | −864.427 |
| S13 | | 6.9455 | 0.0357 | | | |
| S14 | Sixth | 11.4972 | 0.3985 | 1.667 | 20.353 | 17.077 |
| S15 | Lens | −1192.9897 | 1.0000 | | | |
| S16 | Filter | infinity | 0.2100 | 1.518 | 64.197 | |
| S17 | | infinity | 4.6436 | | | |
| S18 | Imaging plane | infinity | −0.0036 | | | |

TABLE 2

| Surface No. | K | A | B | C | D | E |
|---|---|---|---|---|---|---|
| S4 | −3.00E−01 | −3.52E−16 | 1.62E−15 | −2.87E−15 | 2.64E−15 | −1.41E−15 |
| S5 | −1.06E+00 | 6.78E−03 | 4.47E−03 | −2.15E−03 | 4.78E−04 | −6.26E−05 |
| S6 | −6.76E+00 | 6.72E−03 | 9.38E−03 | −3.76E−03 | −6.99E−04 | 1.37E−03 |
| S7 | 5.63E+00 | 2.74E−03 | 1.43E−02 | −6.86E−03 | −1.15E−02 | 2.07E−02 |
| S8 | −2.09E+01 | 1.65E−03 | 2.19E−02 | −3.33E−02 | 2.85E−02 | −1.26E−02 |
| S9 | 1.36E+01 | −3.16E−03 | −3.82E−03 | 1.55E−03 | −2.62E−04 | 2.53E−05 |
| S10 | −1.41E+01 | −2.14E−02 | −8.41E−03 | 9.73E−03 | −1.03E−02 | 6.30E−03 |
| S11 | −1.35E+01 | −1.05E−19 | 2.44E−30 | −3.58E−41 | 3.27E−52 | −1.81E−63 |
| S12 | −5.90E+01 | −2.21E−02 | 2.31E−03 | −1.74E−04 | 1.02E−05 | −4.18E−07 |
| S13 | −5.86E+01 | −2.04E−02 | 1.57E−03 | −5.76E−05 | 1.24E−06 | −1.67E−08 |
| S14 | 1.13E+01 | 2.74E−16 | −2.79E−15 | 8.36E−15 | −1.26E−14 | 1.08E−14 |
| S15 | −5.90E+01 | −1.78E−45 | 2.94E−67 | −1.33E−89 | 3.14E−112 | −4.00E−135 |

| Surface No. | F | G | H | J |
|---|---|---|---|---|
| S4 | 4.53E−16 | −8.61E−17 | 8.91E−18 | −3.86E−19 |
| S5 | 4.98E−06 | −2.37E−07 | 6.20E−09 | −6.86E−11 |
| S6 | −6.96E−04 | 1.84E−04 | −2.50E−05 | 1.37E−06 |
| S7 | −1.41E−02 | 4.99E−03 | −9.24E−04 | 7.15E−05 |
| S8 | 3.01E−03 | −3.97E−04 | 2.74E−05 | −7.75E−07 |
| S9 | −1.49E−06 | 5.28E−08 | −1.03E−09 | 8.57E−12 |
| S10 | −2.34E−03 | 5.14E−04 | −6.02E−05 | 2.89E−06 |
| S11 | 5.54E−75 | −7.14E−87 | 5.65E−106 | −6.49E−118 |
| S12 | 1.10E−08 | −1.76E−10 | 1.54E−12 | −5.59E−15 |
| S13 | 1.44E−10 | −7.73E−13 | 2.38E−15 | −3.23E−18 |
| S14 | −5.52E−15 | 1.65E−15 | −2.69E−16 | 1.83E−17 |
| S15 | 2.59E−158 | −6.68E−182 | 4.04E−208 | −7.77E−232 |

Figure 4:
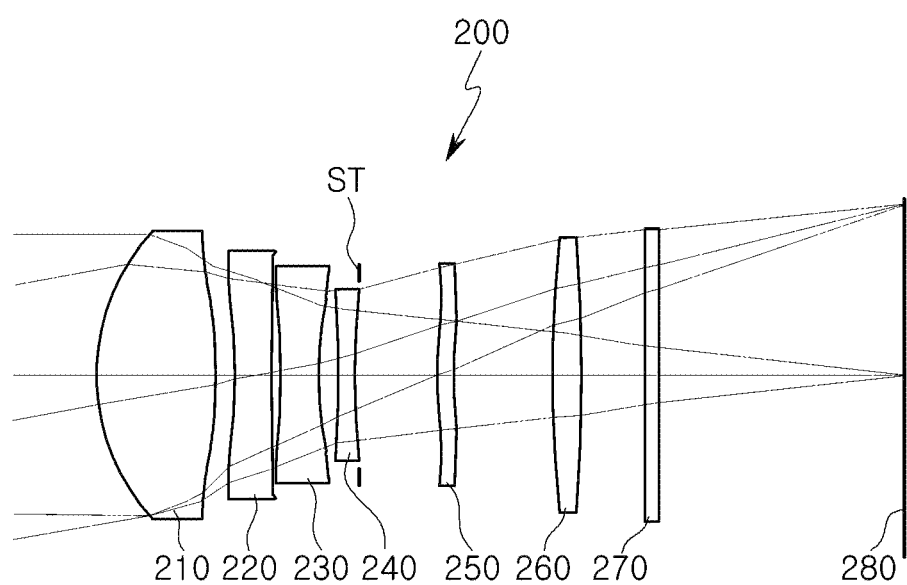
FIG. 4 illustrates a configuration of an optical imaging system according to a second example.
Figure 5:
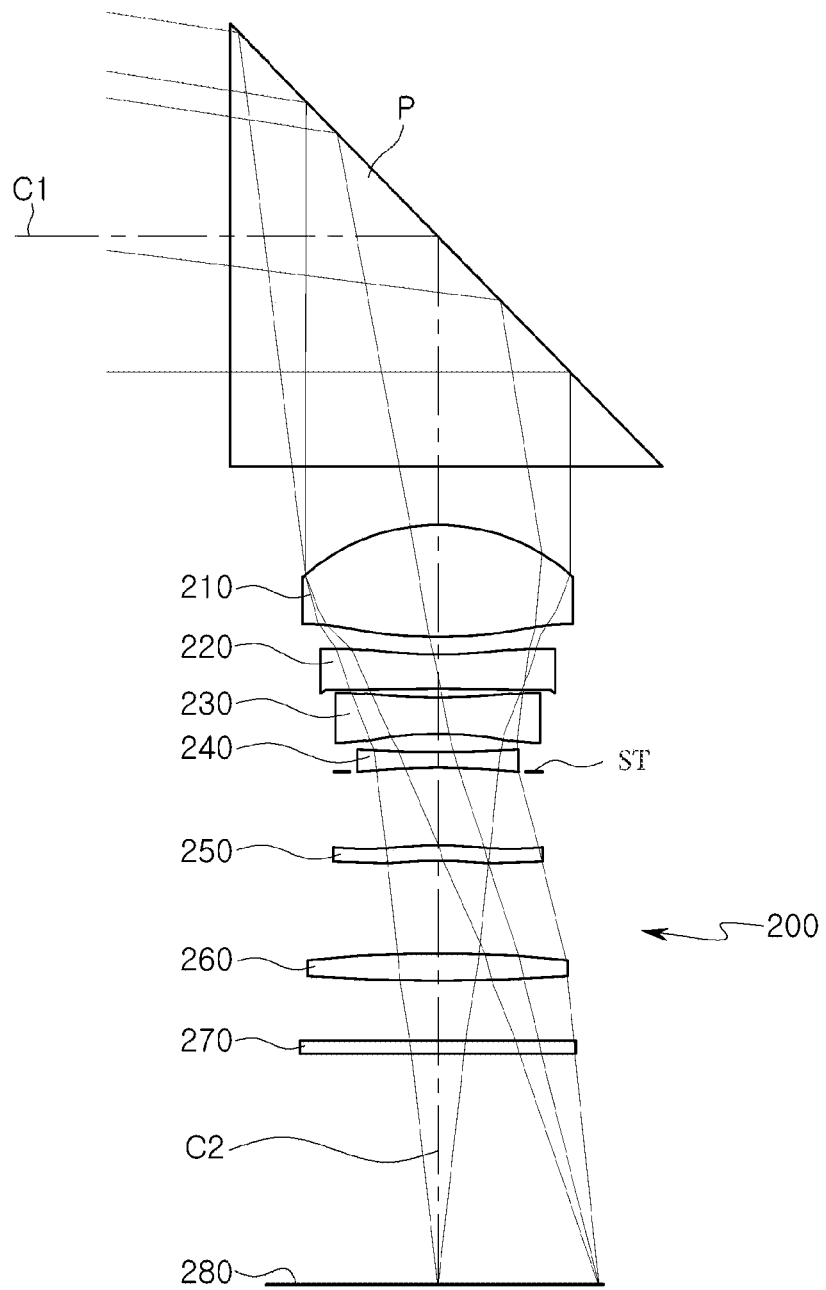
FIG. 5 illustrates a configuration of an optical imaging system including a prism in FIG. 4.

An optical imaging system according to a second example will be described with reference to FIGS. 4 and 5.

The optical imaging system 200 includes a prism P, a first lens 210, a second lens 220, a third lens 230, a fourth lens 240, a fifth lens 250, and a sixth lens 260.

The first lens 210 has positive refractive power. The first lens 210 has a shape in which an object-side surface is convex and an image-side surface is convex. The second lens 220 has negative refractive power. The second lens 220 has a shape in which an object-side surface is concave and an image-side surface is convex. The third lens 230 has negative refractive power. The third lens 230 has a shape in which an object-side surface is concave and an image-side surface is concave. The fourth lens 240 has negative refractive power. The fourth lens 240 has a shape in which an object-side surface is convex and an image-side surface is concave. The fifth lens 250 has negative refractive power. The fifth lens 250 has a shape in which an object-side surface is convex and an image-side surface is concave. The sixth lens 260 has positive refractive power. The sixth lens 260 has a shape in which an object-side surface is convex and an image-side surface is convex.

The optical imaging system 200 includes a prism P, a stop ST, a filter 270, and an image sensor 280.

The optical imaging system includes a prism P as a means for folding or refracting an optical path. The prism P folds light, incident on the first optical axis C1, in a direction of a second optical axis C2. The second optical axis C2, folded by the prism P, may have a substantially right angle to a first optical axis C1. The prism P is disposed on the object-side of the first lens 210. The above-described prism P refracts light, reflected from an object (a subject), to the image sensor 280.

The filter 270 is disposed in front of the image sensor 280 to cut off infrared rays, or the like, included in the incident light. The image sensor 280 includes a plurality of optical sensors. The above-configured image sensor 280 is configured to convert an optical signal into an electrical signal.

Figure 6:
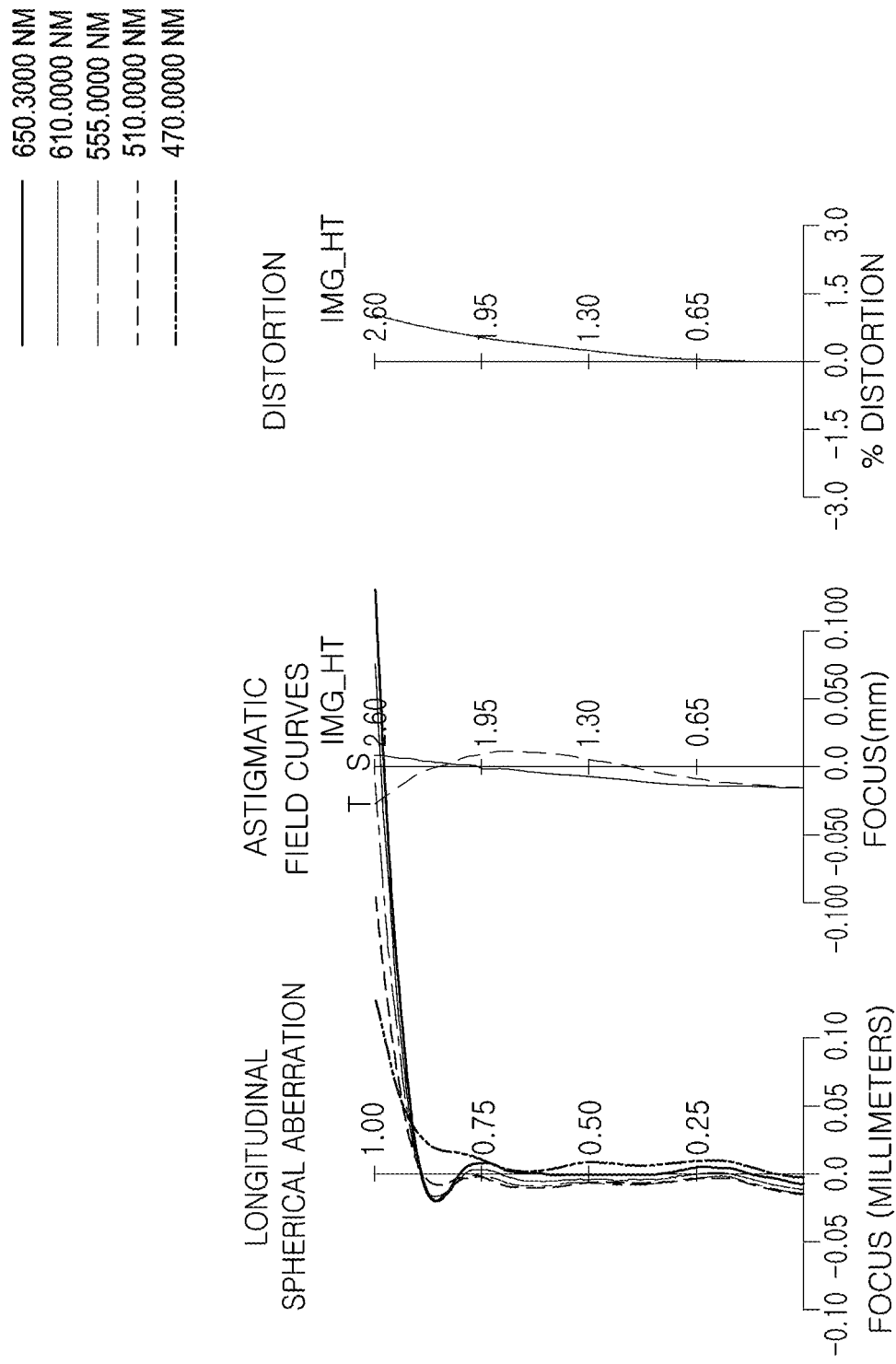
FIG. 6 is aberration curves of the optical imaging system illustrated in FIG. 4.

Table 3 shows lens characteristics of the optical imaging system according to this example, and Table 4 shows aspherical values of the optical imaging system according to this example. FIG. 6 is aberration curves of the above-configured optical imaging system 200.

object-side surface is convex and an image-side surface is convex. The fifth lens 350 has negative refractive power. The fifth lens 350 has a shape in which an object-side

TABLE 3

| Surface No. | Remark | Radius of Curvature | Thickness/ Distance | Refractive Index | Abbe Number | Focal Length |
|---|---|---|---|---|---|---|
| S1 | Prism | infinity | 3.4000 | 1.722 | 29.500 | |
| S2 | | infinity | 3.4000 | 1.722 | 29.500 | |
| S3 | | infinity | 1.0000 | | | |
| S4 | First Lens | 3.0302 | 1.8439 | 1.536 | 55.656 | 3.918 |
| S5 | | −5.3918 | 0.3077 | | | |
| S6 | Second Lens | −6.6853 | 0.5664 | 1.667 | 20.353 | −13.381 |
| S7 | | −27.5488 | 0.1431 | | | |
| S8 | Third Lens | −5.2819 | 0.5655 | 1.546 | 56.114 | −5.126 |
| S9 | | 6.1771 | 0.3291 | | | |
| S10 | Fourth Lens | 26.6227 | 0.2300 | 1.667 | 20.353 | −14.723 |
| S11 (STOP) | | 7.1487 | 1.3068 | | | |
| S12 | Fifth Lens | 5.8551 | 0.2300 | 1.536 | 55.656 | −9029.394 |
| S13 | | 5.7679 | 1.5328 | | | |
| S14 | Sixth Lens | 20.4602 | 0.4405 | 1.667 | 20.353 | 17.868 |
| S15 | | −28.2926 | 1.0000 | | | |
| S16 | Filter | infinity | 0.2100 | 1.518 | 64.197 | |
| S17 | | infinity | 3.7736 | | | |
| S18 | Imaging plane | infinity | 0.0137 | | | |

TABLE 4

| Surface No. | K | A | B | C | D | E |
|---|---|---|---|---|---|---|
| S4 | −3.64E−01 | −8.82E−17 | 3.59E−16 | −3.68E−16 | 1.58E−17 | 1.81E−16 |
| S5 | −9.19E−01 | 5.87E−03 | 3.81E−03 | −1.76E−03 | 3.91E−04 | −5.17E−05 |
| S6 | −6.99E+00 | 6.45E−03 | 9.34E−03 | −4.17E−03 | −3.71E−03 | 1.25E−03 |
| S7 | −5.90E+01 | 1.44E−03 | 1.51E−02 | −1.65E−03 | −2.29E−02 | 3.03E−02 |
| S8 | −2.07E+01 | −6.75E−03 | 3.54E−02 | −4.52E−02 | 3.39E−02 | −1.38E−02 |
| S9 | 1.42E+01 | −1.44E−03 | −1.72E−03 | 5.05E−04 | −5.36E−05 | 2.35E−06 |
| S10 | 9.33E+00 | −1.83E−02 | −1.03E−02 | 8.57E−03 | −7.39E−03 | 4.09E−03 |
| S11 | −1.53E+01 | −1.05E−19 | 2.44E−30 | −3.58E−41 | 3.27E−52 | −1.81E−63 |
| S12 | −5.90E+01 | −2.21E−02 | 2.85E−03 | −2.45E−04 | 1.48E−05 | −5.93E−07 |
| S13 | −5.85E+01 | −2.03E−02 | 1.50E−03 | −5.34E−05 | 1.12E−06 | −1.49E−08 |
| S14 | 2.09E+01 | −7.54E−17 | −2.49E−17 | 9.35E−17 | −1.28E−16 | 9.16E−17 |
| S15 | 1.09E+01 | −3.17E−15 | 2.04E−14 | −4.53E−14 | 4.98E−14 | −3.08E−14 |

| Surface No. | F | G | H | J |
|---|---|---|---|---|
| S4 | −1.20E−16 | 3.46E−17 | −4.77E−18 | 2.58E−19 |
| S5 | 4.16E−06 | −1.99E−07 | 5.22E−09 | −5.78E−11 |
| S6 | −6.61E−04 | 1.74E−04 | −2.33E−05 | 1.26E−06 |
| S7 | −1.82E−02 | 5.91E−03 | −1.01E−03 | 7.26E−05 |
| S8 | 3.10E−03 | −3.90E−04 | 2.58E−05 | −6.97E−07 |
| S9 | 6.36E−09 | −4.73E−09 | 1.73E−10 | −2.08E−12 |
| S10 | −1.50E−03 | 3.43E−04 | −4.22E−05 | 2.12E−06 |
| S11 | 5.54E−75 | −7.14E−87 | 5.66E−106 | −6.51E−118 |
| S12 | 1.51E−08 | −2.32E−10 | 1.97E−12 | −7.03E−15 |
| S13 | 1.26E−10 | −6.69E−13 | 2.05E−15 | −2.76E−18 |
| S14 | −3.78E−17 | 9.05E−18 | −1.17E−18 | 6.27E−20 |
| S15 | 1.13E−14 | −2.42E−15 | 2.82E−16 | −1.37E−17 |

Figure 7:
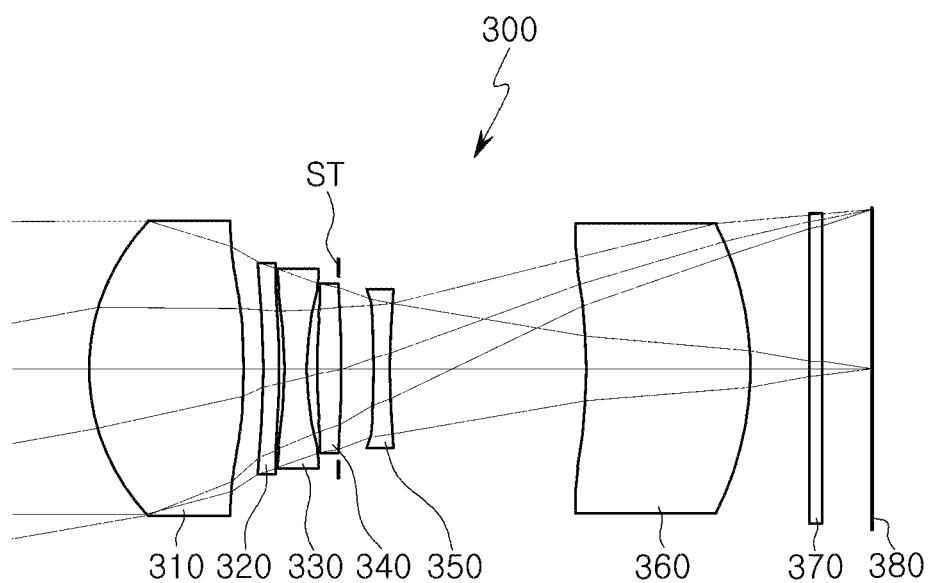
FIG. 7 illustrates a configuration of an optical imaging system according to a third example.
Figure 8:
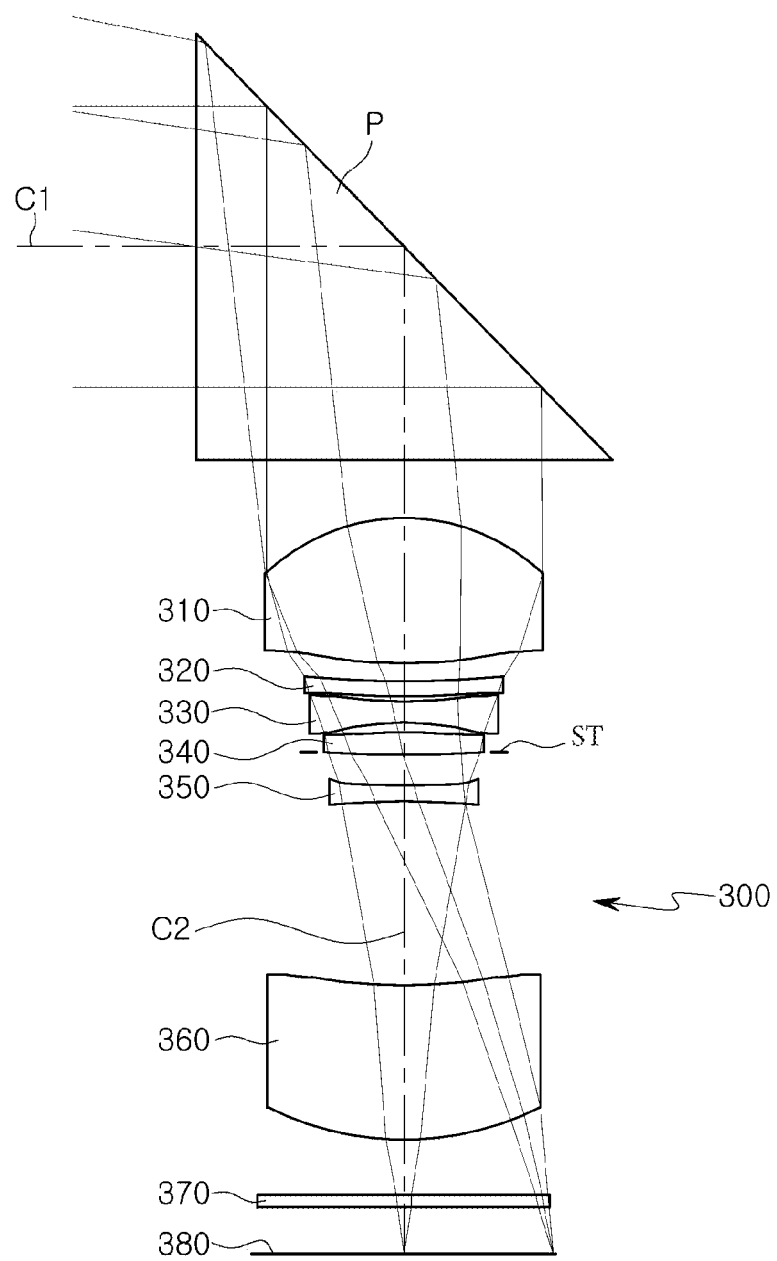
FIG. 8 illustrates a configuration of an optical imaging system including a prism in FIG. 7.

An optical imaging system according to a third example will be described with reference to FIGS. 7 and 8.

An optical imaging system 300 includes a prism P, a first lens 310, a second lens 320, a third lens 330, a fourth lens 340, a fifth lens 350, and a sixth lens 360.

The first lens 310 has positive refractive power. The first lens 310 has a shape in which an object-side surface is convex and an image-side surface is convex. The second lens 320 has negative refractive power. The second lens 320 has a shape in which an object-side surface is concave and an image-side surface is convex. The third lens 330 has negative refractive power. The third lens 330 has a shape in which an object-side surface is concave and an image-side surface is concave. The fourth lens 340 has positive refractive power. The fourth lens 340 has a shape in which an surface is concave and an image-side surface is concave. The sixth lens 360 has positive refractive power. The sixth lens 360 has a shape in which an object-side surface is concave and an image-side surface is convex.

The optical imaging system 300 includes a prism P, a stop ST, a filter 370, and an image sensor 380.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 310. The above-configured prism P refracts light, reflected from an object (a subject), to the image sensor 380.

The filter 370 is disposed in front of the image sensor 380 to cut off infrared rays, or the like, included in the incident light. The image sensor 380 includes a plurality of optical sensors. The above-configured image sensor 380 is configured to convert an optical signal into an electrical signal.

Figure 9:
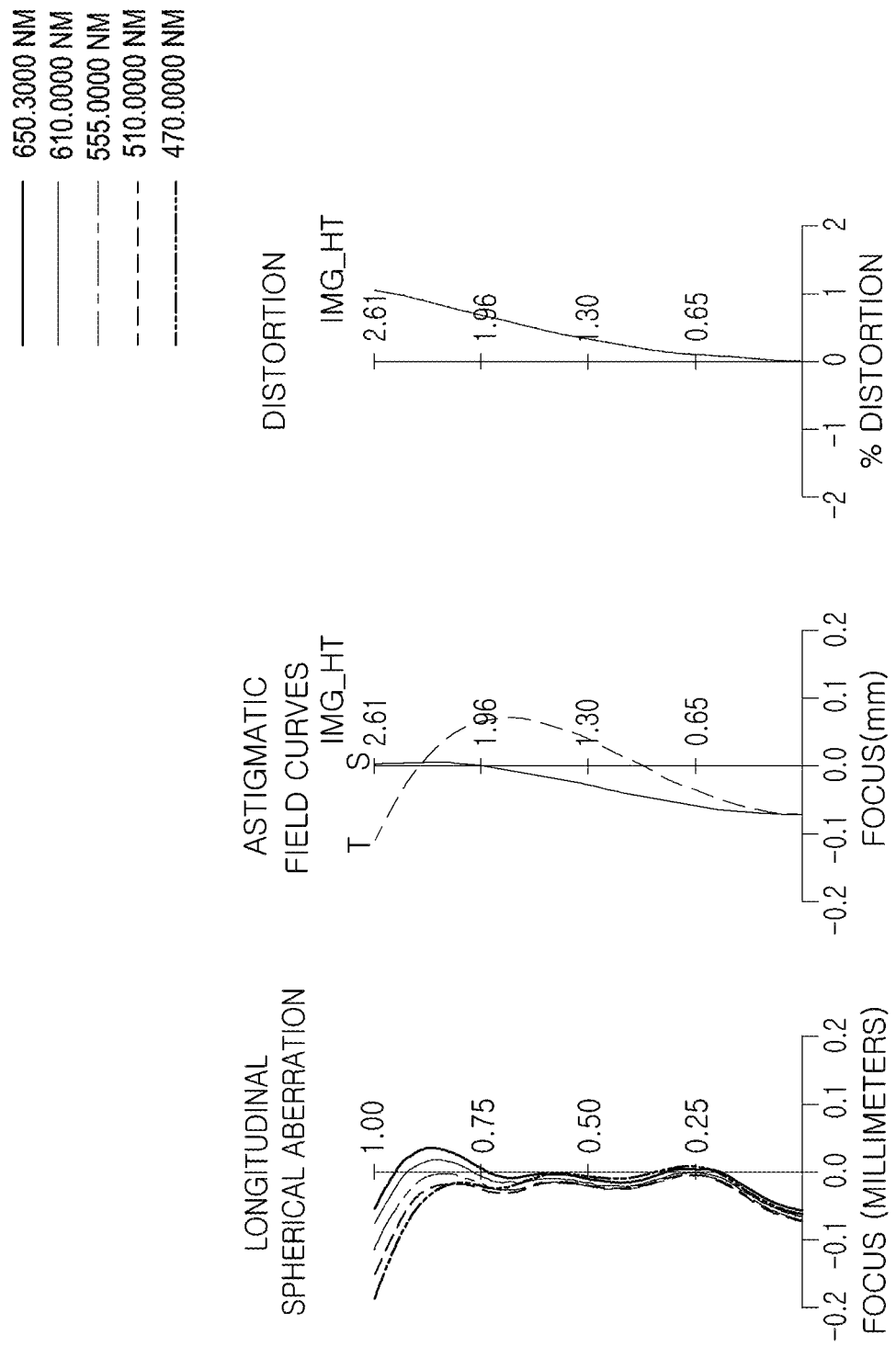
FIG. 9 is aberration curves of the optical imaging system illustrated in FIG. 7.

Table 5 shows lens characteristics of the optical imaging system according to this example, and Table 6 shows aspherical values of the optical imaging system according to this example. FIG. 9 is aberration curves of the above-configured optical imaging system 300.

TABLE 5

| Surface No. | Remark | Radius of Curvature | Thickness/ Distance | Refractive Index | Abbe Number | Focal Length |
|---|---|---|---|---|---|---|
| S1 | Prism | infinity | 3.5000 | 1.722 | 29.500 | |
| S2 | | infinity | 3.5000 | 1.722 | 29.500 | |
| S3 | | infinity | 1.0000 | | | |
| S4 | First Lens | 3.1942 | 2.5585 | 1.536 | 55.656 | 4.209 |
| S5 | | −5.5352 | 0.3354 | | | |
| S6 | Second Lens | −6.9172 | 0.2405 | 1.667 | 20.353 | −40.093 |
| S7 | | −9.4608 | 0.1103 | | | |
| S8 | Third Lens | −3.8543 | 0.3338 | 1.645 | 23.528 | −3.614 |
| S9 | | 6.0879 | 0.1963 | | | |
| S10 | Fourth Lens | 8.3928 | 0.3993 | 1.667 | 20.353 | 8.753 |
| S11 | | −18.8119 | 0.5607 | | | |
| S12(STOP) | Fifth Lens | −13.3268 | 0.2300 | 1.536 | 55.656 | −8.189 |
| S13 | | 6.5859 | 3.2485 | | | |
| S14 | Sixth Lens | −9.1645 | 2.7139 | 1.546 | 56.114 | 24.178 |
| S15 | | −5.9747 | 1.0000 | | | |
| S16 | Filter | infinity | 0.2100 | 1.518 | 64.197 | |
| S17 | | infinity | 0.7540 | | | |
| S18 | Imaging plane | infinity | 0.0714 | | | |

TABLE 6

| Surface No. | K | A | B | C | D | E |
|---|---|---|---|---|---|---|
| S4 | −4.56E−01 | 3.22E−16 | −1.32E−15 | 2.04E−15 | −1.60E−15 | 7.10E−16 |
| S5 | −9.88E−01 | 5.07E−03 | 2.75E−03 | −1.10E−03 | 2.42E−04 | −3.33E−05 |
| S6 | −7.24E+00 | −1.27E−04 | 3.53E−02 | −4.35E−02 | 3.04E−02 | −1.26E−02 |
| S7 | −4.95E+01 | −1.01E−02 | 4.73E−02 | −3.63E−02 | −1.21E−02 | 3.68E−02 |
| S8 | −2.13E+01 | −1.06E−02 | 4.91E−02 | −5.95E−02 | 4.08E−02 | −1.55E−02 |
| S9 | 1.48E+01 | 6.27E−03 | −8.87E−03 | 2.60E−03 | −2.40E−04 | −1.31E−05 |
| S10 | 2.99E+01 | −3.02E−02 | 1.15E−02 | −1.86E−02 | 1.39E−02 | −5.62E−03 |
| S11 | 3.35E+01 | 2.25E−14 | −2.29E−13 | 1.02E−12 | −2.50E−12 | 3.67E−12 |
| S12 | 1.05E+01 | −2.72E−02 | 2.51E−03 | −1.35E−04 | 5.06E−06 | −1.36E−07 |
| S13 | −4.26E+01 | −1.66E−03 | 1.11E−03 | −6.65E−05 | 1.78E−06 | −2.49E−08 |
| S14 | 6.56E+00 | 3.43E−15 | −6.18E−15 | −1.67E−14 | 5.23E−14 | −5.63E−14 |
| S15 | 1.87E+00 | −3.39E−15 | 1.17E−14 | −1.64E−14 | 1.21E−14 | −5.20E−15 |

| Surface No. | F | G | H | J |
|---|---|---|---|---|
| S4 | −1.87E−16 | 2.87E−17 | −2.39E−18 | 8.29E−20 |
| S5 | 2.81E−06 | −1.40E−07 | 3.78E−09 | −4.28E−11 |
| S6 | 3.07E−03 | −4.21E−04 | 2.85E−05 | −6.54E−07 |
| S7 | −2.47E−02 | 8.05E−03 | −1.33E−03 | 8.94E−05 |
| S8 | 3.31E−03 | −3.98E−04 | 2.51E−05 | −6.46E−07 |
| S9 | 4.56E−06 | −3.90E−07 | 1.51E−08 | −2.30E−10 |
| S10 | 1.08E−03 | −5.08E−05 | −1.06E−05 | 1.09E−06 |
| S11 | −3.28E−12 | 1.76E−12 | −5.15E−13 | 6.36E−14 |
| S12 | 2.55E−09 | −2.60E−11 | −1.20E−12 | 1.76E−13 |
| S13 | 1.76E−10 | −6.05E−13 | 2.34E−15 | −1.27E−17 |
| S14 | 3.13E−14 | −9.64E−15 | 1.57E−15 | −1.06E−16 |
| S15 | 1.35E−15 | −2.08E−16 | 1.76E−17 | −6.27E−19 |

Figure 10:
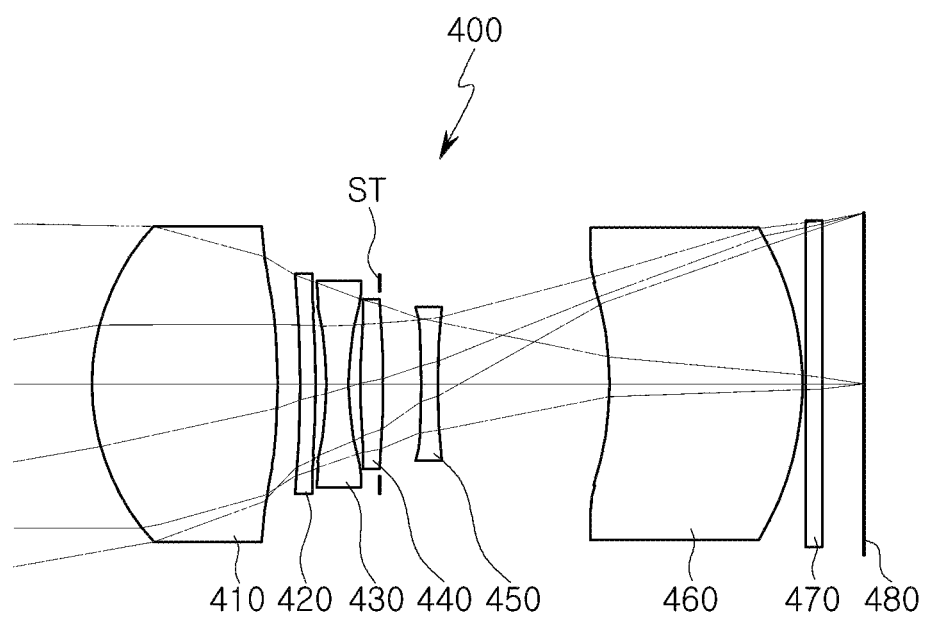
FIG. 10 illustrates a configuration of an optical imaging system according to a fourth example.
Figure 11:
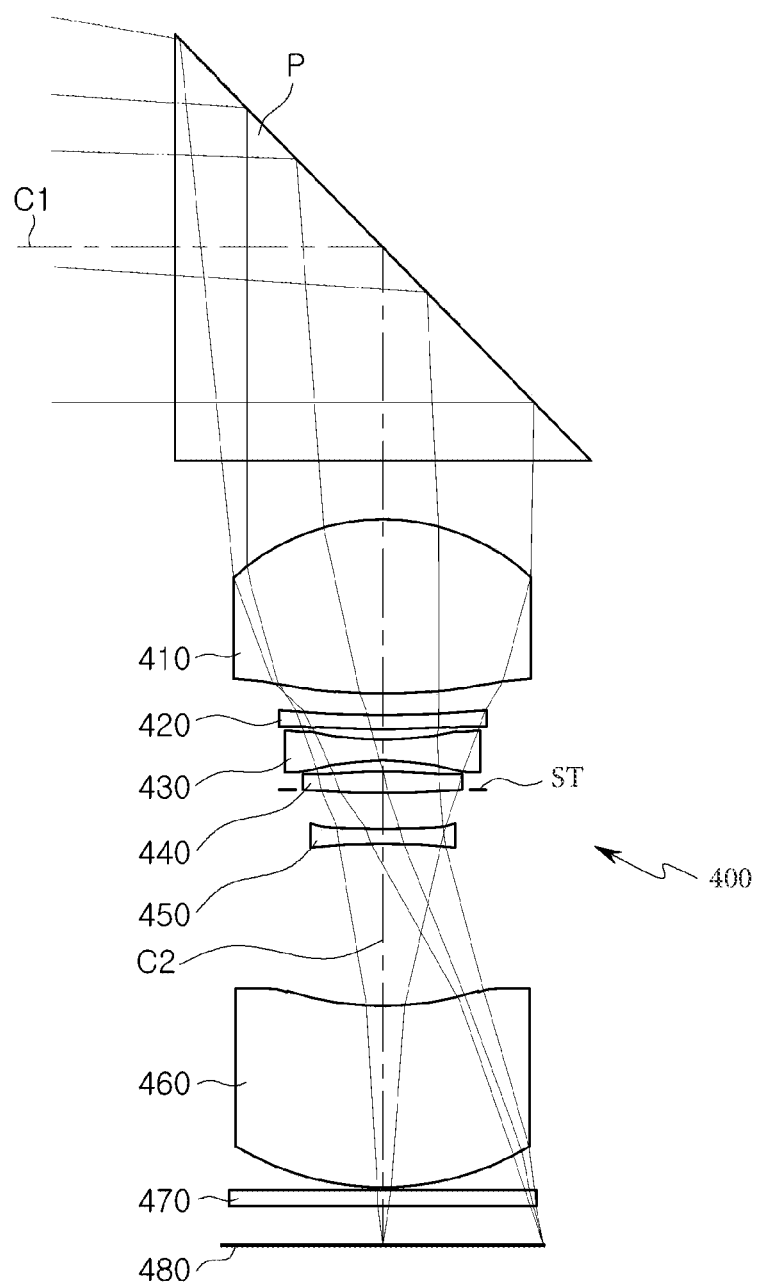
FIG. 11 illustrates a configuration of an optical imaging system including a prism in FIG. 10.

An optical imaging system according to a fourth example will be described with reference to FIGS. 10 and 11.

An optical imaging system 400 includes a prism P, a first lens 410, a second lens 420, a third lens 430, a fourth lens 440, a fifth lens 450, and a sixth lens 460.

The first lens 410 has positive refractive power. The first lens 410 has s shape in which an object-side surface is convex and an image-side surface is convex. The second lens 420 has positive refractive power. The second lens 420 has a shape in which an object-side surface is concave and an image-side surface is convex. The third lens 430 has negative refractive power. The third lens 430 has a shape in which an object-side surface is concave and an image-side surface is concave. The fourth lens 440 has positive refractive power. The fourth lens 440 has a shape in which an object-side surface is convex and an image-side surface is convex. The fifth lens 450 has negative refractive power. The fifth lens 450 has a shape in which an object-side surface is concave and an image-side surface is concave. The sixth lens 460 has positive refractive power. The sixth lens 460 has a shape in which an object-side surface is concave and an image-side surface is convex.

The optical imaging system 400 includes a prism P, a stop ST, a filter 470, and an image sensor 480.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 410. The above-configured prism P refracts light, reflected from an object (a subject), to the image sensor 480.

The filter 470 is disposed in front of the image sensor 480 to cut off infrared rays, or the like, included in the incident light. The image sensor 480 includes a plurality of optical sensors. The above-configured image sensor 480 is configured to convert an optical signal into an electrical signal.

Figure 12:
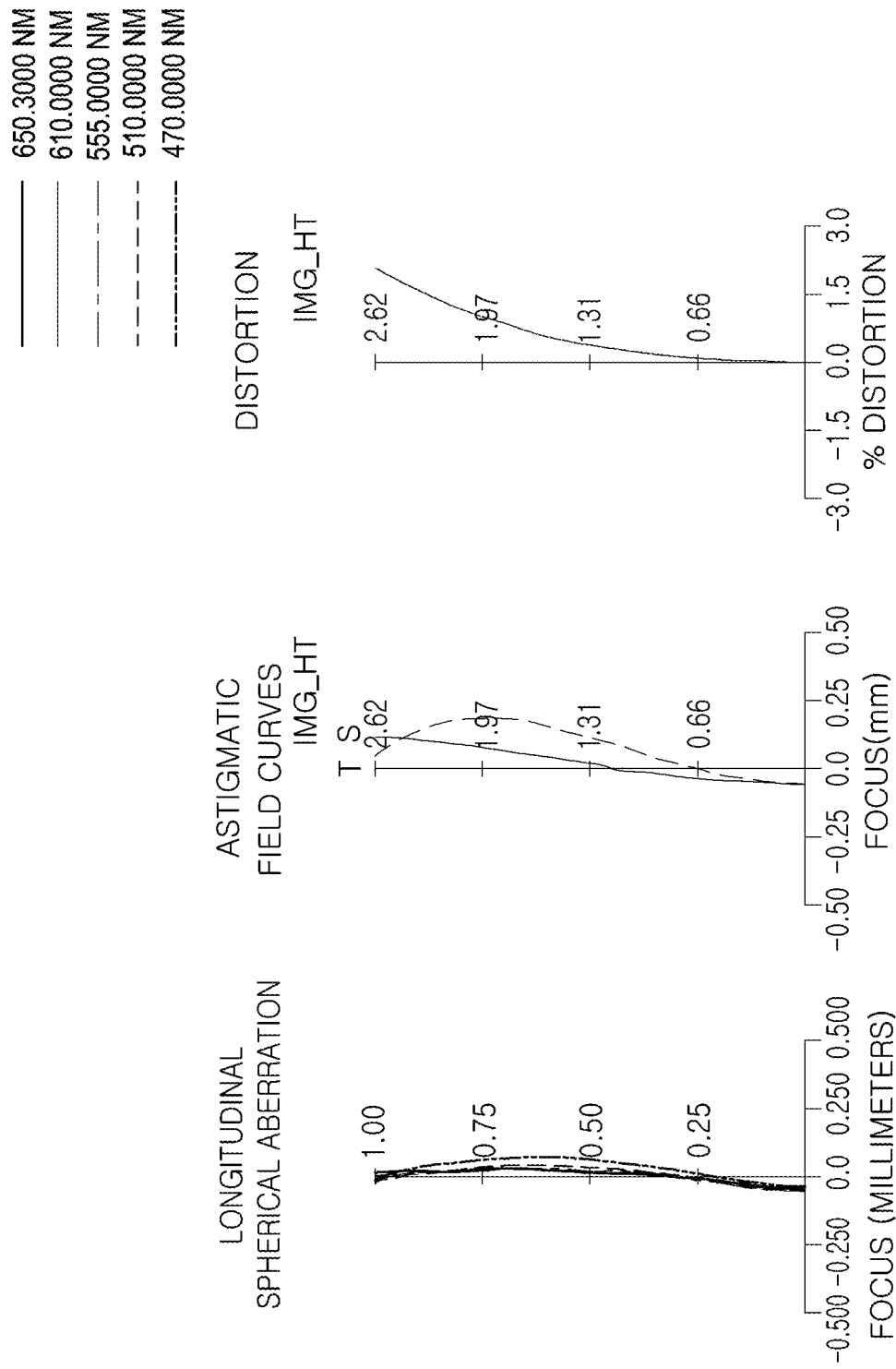
FIG. 12 is aberration curves of the optical imaging system illustrated in FIG. 10.

Table 7 shows lens characteristics of the optical imaging system according to this example, and Table 8 shows aspherical values of the optical imaging system according to this example. FIG. 12 is aberration curves of the above-configured optical imaging system 400.

Figure 13:
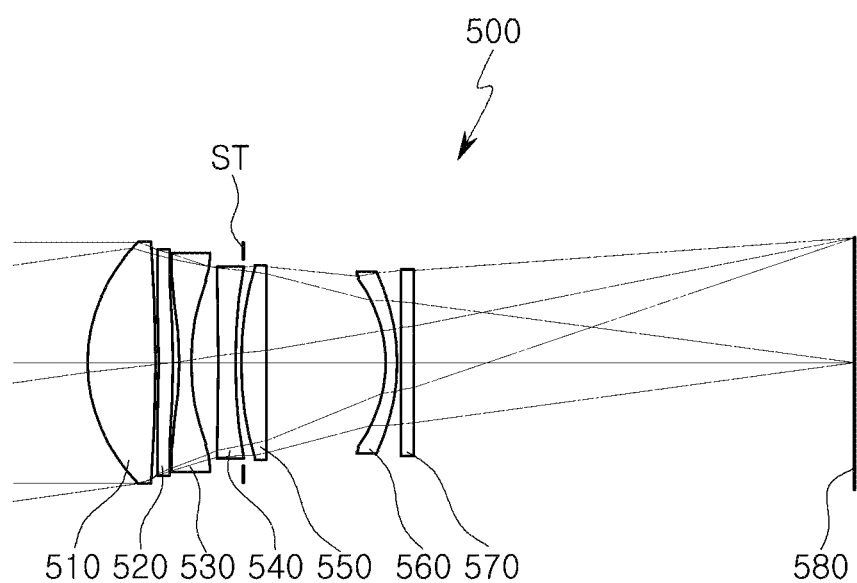
FIG. 13 illustrates a configuration of an optical imaging system according to a fifth example.
Figure 14:
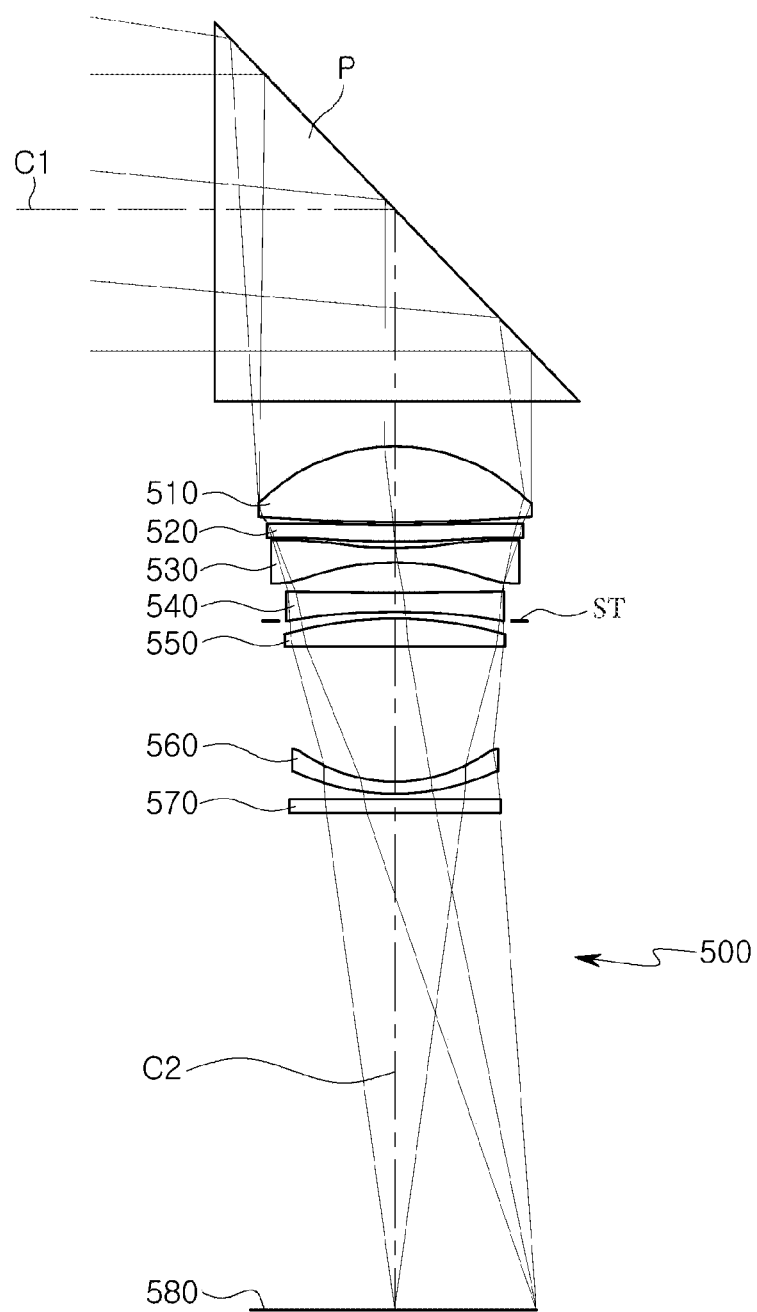
FIG. 14 illustrates a configuration of an optical imaging system including a prism in FIG. 13.

An optical imaging system according to a fifth example will be described with reference to FIGS. 13 and 14.

An optical imaging system 500 includes a prism P, a first lens 510, a second lens 520, a third lens 530, a fourth lens 540, a fifth lens 550, and a sixth lens 560.

The first lens 510 has positive refractive power. The first lens 510 has a shape in which an object-side surface is convex and an image-side surface is convex. The second lens 520 has positive refractive power. The second lens 520 has a shape an object-side surface is concave and an image-side surface is convex. The third lens 530 has negative refractive power. The third lens 530 has a shape in which an object-side surface is concave and an image-side surface is concave. The fourth lens 540 has negative refractive power. The fourth lens 540 has a shape in which an object-side surface is convex and an image-side surface is concave. The fifth lens 550 has positive refractive power. The fifth lens

TABLE 7

| Surface No. | Remark | Radius of Curvature | Thickness/ Distance | Refractive Index | Abbe Number | Focal Length |
|---|---|---|---|---|---|---|
| S1 | Prism | infinity | 3.4000 | 1.722 | 29.500 | |
| S2 | | infinity | 3.4000 | 1.722 | 29.500 | |
| S3 | | infinity | 0.5000 | | | |
| S4 | First Lens | 3.2118 | 2.8977 | 1.536 | 55.656 | 4.327 |
| S5 | | -5.7208 | 0.3650 | | | |
| S6 | Second Lens | -7.2351 | 0.2502 | 1.667 | 20.353 | 26.608 |
| S7 | | -5.2107 | 0.1416 | | | |
| S8 | Third Lens | -2.9039 | 0.3265 | 1.645 | 23.528 | -2.994 |
| S9 | | 6.0096 | 0.1927 | | | |
| S10 | Fourth Lens | 8.2640 | 0.3602 | 1.667 | 20.353 | 7.892 |
| S11 | | -14.2428 | 0.5779 | | | |
| S12(STOP) | Fifth Lens | -10.7083 | 0.2300 | 1.667 | 20.353 | -6.513 |
| S13 | | 7.3717 | 2.6847 | | | |
| S14 | Sixth Lens | -5.1394 | 3.0000 | 1.546 | 56.114 | 22.684 |
| S15 | | -4.3808 | 0.0300 | | | |
| S16 | Filter | infinity | 0.2500 | 1.518 | 64.197 | |
| S17 | | infinity | 0.6104 | | | |
| S18 | Imaging plane | infinity | 0.0500 | | | |

TABLE 8

| Surface No. | K | A | B | C | D | E |
|---|---|---|---|---|---|---|
| S4 | -4.53E-01 | 6.43E-17 | -4.39E-16 | 8.70E-16 | -7.80E-16 | 3.77E-16 |
| S5 | -9.44E-01 | 6.05E-03 | 2.24E-03 | -1.03E-03 | 2.42E-04 | -3.46E-05 |
| S6 | -7.31E+00 | -3.82E-03 | 4.64E-02 | -5.82E-02 | 4.14E-02 | -1.75E-02 |
| S7 | -4.93E+01 | -1.02E-02 | 5.45E-02 | -6.22E-02 | 2.76E-02 | 3.74E-03 |
| S8 | -2.13E+01 | -1.28E-02 | 5.26E-02 | -6.09E-02 | 4.07E-02 | -1.52E-02 |
| S9 | 1.49E+01 | 5.17E-03 | -7.95E-03 | 2.28E-03 | -1.75E-04 | -2.10E-05 |
| S10 | 2.98E+01 | -2.61E-02 | -1.57E-03 | -2.45E-04 | -3.46E-04 | 8.97E-04 |
| S11 | 3.23E+01 | -1.14E-14 | 2.51E-13 | -1.42E-12 | 3.64E-12 | -4.91E-12 |
| S12 | 1.08E+01 | -2.90E-02 | 2.80E-03 | -1.67E-04 | 7.10E-06 | -2.18E-07 |
| S13 | -4.50E+01 | -3.04E-03 | 1.12E-03 | -6.38E-05 | 1.73E-06 | -2.70E-08 |
| S14 | 6.02E+00 | -1.53E-14 | 9.98E-14 | -2.51E-13 | 3.24E-13 | -2.42E-13 |
| S15 | 1.31E+00 | -1.37E-16 | 4.80E-16 | -6.94E-16 | 4.94E-16 | -1.92E-16 |

| Surface No. | F | G | H | J |
|---|---|---|---|---|
| S4 | -1.05E-16 | 1.69E-17 | -1.46E-18 | 5.27E-20 |
| S5 | 2.97E-06 | -1.49E-07 | 4.03E-09 | -4.56E-11 |
| S6 | 4.39E-03 | -6.32E-04 | 4.72E-05 | -1.34E-06 |
| S7 | -8.72E-03 | 3.59E-03 | -6.60E-04 | 4.77E-05 |
| S8 | 3.21E-03 | -3.83E-04 | 2.39E-05 | -6.09E-07 |
| S9 | 5.17E-06 | -4.19E-07 | 1.59E-08 | -2.39E-10 |
| S10 | -7.34E-04 | 2.51E-04 | -3.81E-05 | 2.15E-06 |
| S11 | 3.60E-12 | -1.32E-12 | 1.59E-13 | 1.49E-14 |
| S12 | 4.66E-09 | -9.38E-11 | 1.18E-11 | -1.72E-12 |
| S13 | 2.56E-10 | -1.61E-12 | 7.15E-15 | -1.78E-17 |
| S14 | 1.08E-13 | -2.88E-14 | 4.20E-15 | -2.59E-16 |
| S15 | 4.21E-17 | -5.14E-18 | 3.15E-19 | -7.15E-21 |

550 has a shape in which an object-side surface is convex and an image-side surface is convex. The sixth lens 560 has negative refractive power. The sixth lens 560 has a shape in which an object-side surface is concave and an image-side surface is convex.

The optical imaging system 500 includes a prism P, a stop ST, a filter 570, and an image sensor 580.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 510. The above-configured prism P refracts light, reflected from an object (a subject), to the image sensor 580.

The filter 570 is disposed in front of the image sensor 580 to cut off infrared rays, or the like, included in the incident light. The image sensor 580 includes a plurality of optical sensors. The above-configured image sensor 580 is configured to convert an optical signal into an electrical signal.

Figure 15:
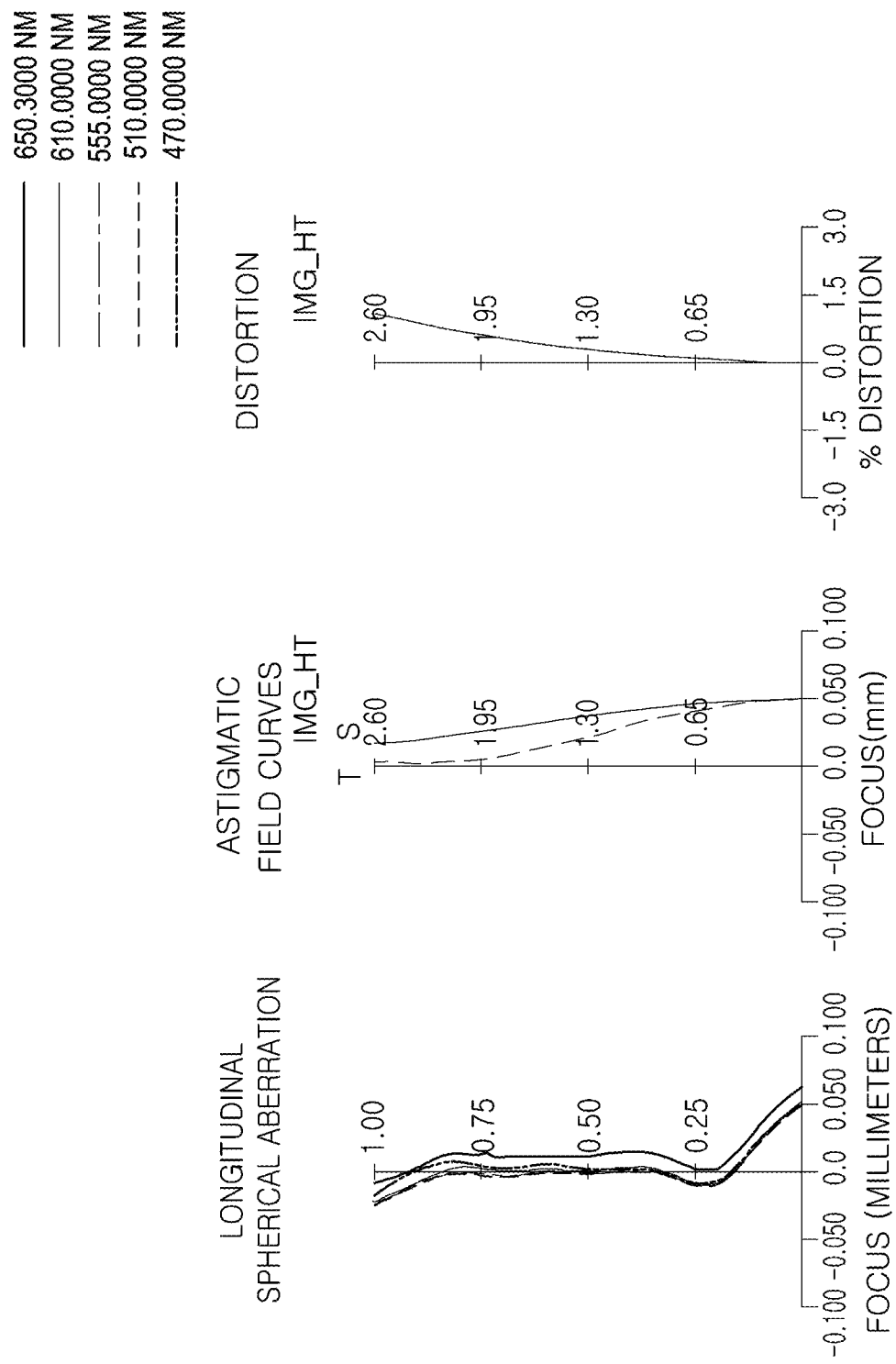
FIG. 15 is aberration curves of the optical imaging system illustrated in FIG. 13.

Table 9 shows lens characteristics of the optical imaging system according to this example, and Table 10 shows aspherical values of the optical imaging system according to this example. FIG. 15 is aberration curves of the above-configured optical imaging system 500.

TABLE 9

| Surface No. | Remark | Radius of Curvature | Thickness/ Distance | Refractive Index | Abbe Number | Focal Length |
| --- | --- | --- | --- | --- | --- | --- |
| S1 | Prism | infinity | 3.5000 | 1.722 | 29.500 | |
| S2 | | infinity | 3.5000 | 1.722 | 29.500 | |
| S3 | | infinity | 0.8000 | | | |
| S4 | First Lens | 3.5474 | 1.4510 | 1.536 | 55.656 | 5.006 |
| S5 | | −9.4495 | 0.0300 | | | |
| S6 | Second Lens | −13.6946 | 0.2771 | 1.667 | 20.353 | 19.251 |
| S7 | | −6.6801 | 0.1421 | | | |
| S8 | Third Lens | −3.4983 | 0.2389 | 1.645 | 23.528 | −3.858 |
| S9 | | 8.8271 | 0.5683 | | | |
| S10 | Fourth Lens | 11.8955 | 0.3626 | 1.536 | 55.656 | −24.270 |
| S11 | | 6.2006 | 0.1444 | | | |
| S12(STOP) | Fifth Lens | 6.9905 | 0.5415 | 1.667 | 20.353 | 9.901 |
| S13 | | −115.4722 | 2.5126 | | | |
| S14 | Sixth Lens | −3.0195 | 0.2300 | 1.536 | 55.656 | −17.907 |
| S15 | | −4.4864 | 0.1000 | | | |
| S16 | Filter | infinity | 0.2500 | 1.518 | 64.197 | |
| S17 | | infinity | 9.3519 | | | |
| S18 | Imaging plane | infinity | −0.0500 | | | |

TABLE 10

| Surface No. | K | A | B | C | D | E |
| --- | --- | --- | --- | --- | --- | --- |
| S4 | 9.95E−02 | 4.45E−17 | −1.80E−16 | 2.49E−16 | −1.67E−16 | 6.33E−17 |
| S5 | −2.18E+01 | 3.35E−03 | 1.92E−03 | −8.92E−04 | 1.62E−04 | −1.59E−05 |
| S6 | −1.92E+01 | 7.99E−03 | −1.27E−02 | 1.42E−02 | −7.83E−03 | 2.52E−03 |
| S7 | −5.50E+01 | 7.71E−03 | −2.41E−02 | 3.29E−02 | −1.97E−02 | 6.58E−03 |
| S8 | −2.08E+01 | 1.04E−02 | −3.42E−02 | 1.09E−02 | −8.84E−03 | 3.35E−03 |
| S9 | 1.43E+01 | 1.88E−02 | −1.42E−03 | −1.77E−03 | 5.26E−04 | −6.34E−05 |
| S10 | 2.83E+01 | −4.06E−02 | 2.69E−02 | −1.64E−02 | 7.78E−03 | −2.73E−03 |
| S11 | −5.42E+01 | 2.00E−16 | −1.02E−15 | 2.04E−15 | −2.12E−15 | 1.28E−15 |
| S12 | 6.05E−04 | 4.42E−04 | −3.89E−05 | 1.70E−06 | −4.26E−08 | 6.36E−10 |
| S13 | 5.87E+01 | 2.80E−15 | −2.07E−14 | 5.09E−14 | −6.15E−14 | 4.18E−14 |
| S14 | 3.31E−01 | 2.57E−15 | −6.93E−15 | −8.64E−15 | 4.41E−14 | −5.80E−14 |
| S15 | −3.42E−02 | −2.43E−15 | 7.04E−15 | −7.81E−15 | 6.92E−15 | −6.23E−15 |

| Surface No. | F | G | H | J |
| --- | --- | --- | --- | --- |
| S4 | −1.46E−17 | 2.05E−18 | −1.66E−19 | 5.88E−21 |
| S5 | 9.09E−07 | −3.04E−08 | 5.52E−10 | −4.21E−12 |
| S6 | −5.01E−04 | 6.03E−05 | −4.03E−06 | 1.15E−07 |
| S7 | −1.31E−03 | 1.53E−04 | −9.64E−06 | 2.52E−07 |
| S8 | −7.07E−04 | 8.51E−05 | −5.45E−06 | 1.44E−07 |
| S9 | 4.05E−06 | −1.45E−07 | 2.73E−09 | −2.14E−11 |
| S10 | 6.42E−04 | −9.42E−05 | 7.68E−06 | −2.64E−07 |
| S11 | −4.68E−16 | 1.02E−16 | −1.21E−17 | 6.07E−19 |
| S12 | −5.60E−12 | 2.69E−14 | −5.44E−17 | |
| S13 | −1.68E−14 | 3.94E−15 | −5.01E−16 | 2.67E−17 |
| S14 | 3.78E−14 | −1.34E−14 | 2.47E−15 | −1.86E−16 |
| S15 | 3.91E−15 | −1.39E−15 | 2.54E−16 | −1.84E−17 |

Figure 16:
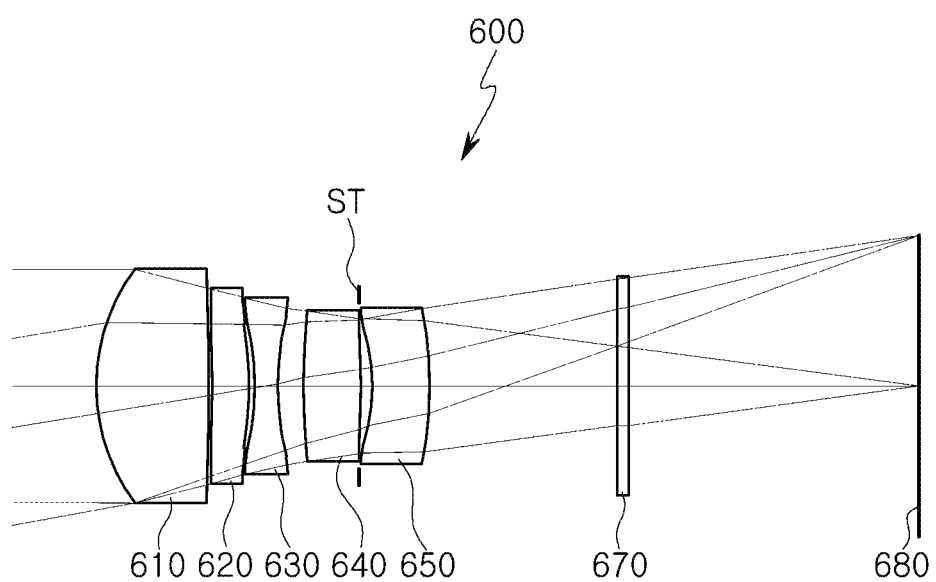
FIG. 16 illustrates a configuration of an optical imaging system according to a sixth example.
Figure 17:
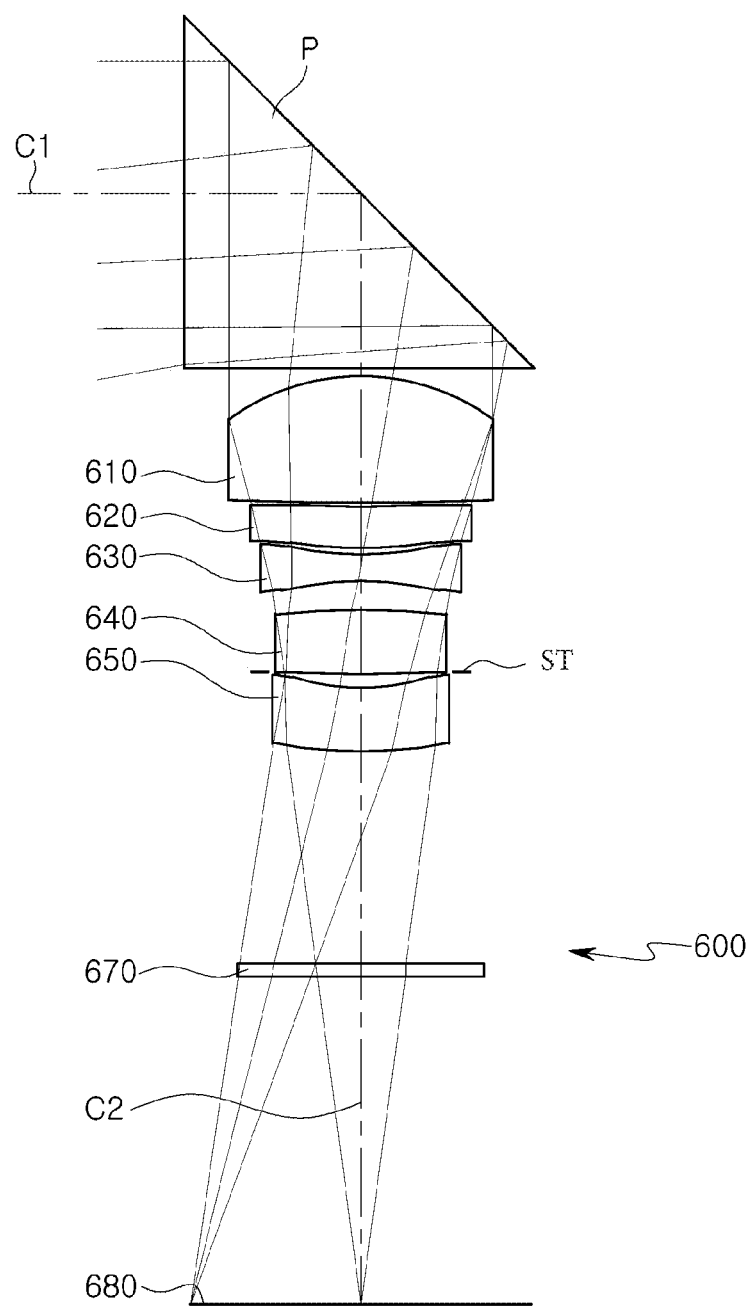
FIG. 17 illustrates a configuration of an optical imaging system including a prism in FIG. 16.

An optical imaging system according to a sixth example will be described with reference to FIGS. 16 and 17.

The optical imaging system 600 includes a prism P, a first lens 610, a second lens 620, a third lens 630, a fourth lens 640, and a fifth lens 650.

The first lens 610 has positive refractive power. The first lens 610 has a shape in which an object-side surface is convex and an image-side surface is convex. The second lens 620 has positive refractive power. The second lens 620 has a shape in which an object-side surface is concave and an image-side surface is convex. The third lens 630 has negative refractive power. The third lens 630 has a shape in which an object-side surface is concave and an image-side surface is concave. The fourth lens 640 has positive refractive power. The fourth lens 640 has a shape in which an object-side surface is convex and an image-side surface is convex. The fifth lens 650 has negative refractive power. The fifth lens 650 has a shape in which an object-side surface is concave and an image-side surface is convex.

The optical imaging system 600 includes a prism P, a stop ST, a filter 670, and an image sensor 680.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 610. The above-configured prism P refracts light, reflected from an object (a subject), to the image sensor 680.

The filter 670 is disposed in front of the image sensor 680 to cut off infrared rays, or the like, included in the incident light. The image sensor 680 includes a plurality of optical sensors. The above-configured image sensor 680 is configured to convert an optical signal into an electrical signal.

Figure 18:
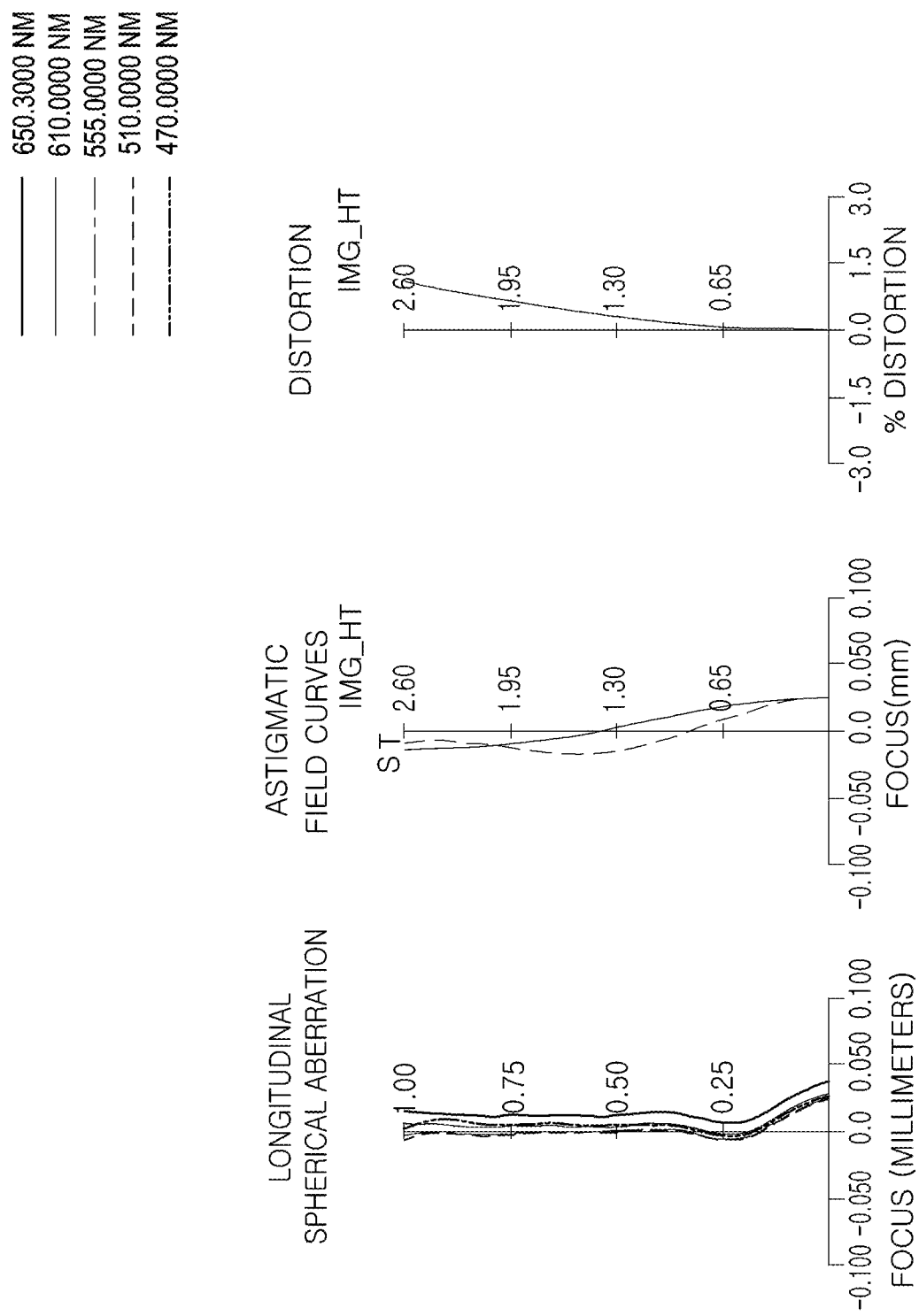
FIG. 18 is aberration curves of the optical imaging system illustrated in FIG. 16.

Table 11 shows lens characteristics of the optical imaging system according to this example, and Table 12 shows aspherical values of the optical imaging system according to this example. FIG. 18 is aberration curves of the above-configured optical imaging system 600.

TABLE 11

| Surface No. | Remark | Radius of Curvature | Thickness/ Distance | Refractive Index | Abbe Number | Focal Length |
|---|---|---|---|---|---|---|
| S1 | Prism | infinity | 2.7000 | 1.722 | 29.500 | |
| S2 | | infinity | 2.7000 | 1.722 | 29.500 | |
| S3 | | infinity | 0.0500 | | | |
| S4 | First Lens | 3.2465 | 1.9937 | 1.536 | 55.656 | 4.894 |
| S5 | | −10.7362 | 0.0300 | | | |
| S6 | Second Lens | −12.6954 | 0.6617 | 1.667 | 20.353 | 7.543 |
| S7 | | −3.6780 | 0.0770 | | | |
| S8 | Third Lens | −2.5204 | 0.4051 | 1.645 | 23.528 | −2.693 |
| S9 | | 5.9253 | 0.4383 | | | |
| S10 | Fourth Lens | 8.5076 | 1.0000 | 1.667 | 20.353 | 11.418 |
| S11(STOP) | | −69.1720 | 0.1972 | | | |
| S12 | Fifth Lens | −4.2792 | 1.0000 | 1.536 | 55.656 | −18.607 |
| S13 | | −8.1054 | 3.2485 | | | |
| S14 | Filter | infinity | 0.2100 | 1.518 | 64.197 | |
| S15 | | infinity | 5.0470 | | | |
| S16 | Imaging plane | infinity | −0.0250 | | | |

TABLE 12

| Surface No. | K | A | B | C | D | E |
|---|---|---|---|---|---|---|
| S4 | −1.29E−01 | −3.21E−16 | 1.96E−15 | −4.25E−15 | 4.54E−15 | −2.71E−15 |
| S5 | 4.89E+00 | 2.03E−02 | −3.46E−03 | −3.47E−04 | 2.66E−04 | −4.82E−05 |
| S6 | 7.73E+00 | 2.12E−02 | −9.94E−03 | 1.43E−02 | −1.50E−02 | 8.98E−03 |
| S7 | −4.25E+01 | −3.81E−02 | 6.65E−02 | −1.12E−02 | −4.09E−02 | 4.13E−02 |
| S8 | −2.24E+01 | −4.74E−02 | 1.20E−01 | −1.05E−01 | 5.14E−02 | −1.45E−02 |
| S9 | 1.23E+01 | 2.63E−02 | −2.23E−02 | 6.61E−03 | −9.56E−04 | 7.15E−05 |
| S10 | 3.07E+01 | −1.82E−02 | 3.02E−03 | −3.39E−03 | 6.39E−04 | 4.60E−04 |
| S11 | 5.90E+01 | 5.36E−14 | −1.01E−12 | 6.95E−12 | −2.39E−11 | 4.68E−11 |
| S12 | 5.45E+00 | −2.30E−03 | 6.09E−04 | −5.73E−05 | 3.17E−06 | −1.05E−07 |
| S13 | 1.26E+01 | −2.57E−03 | −6.92E−05 | 1.19E−05 | −4.35E−07 | 7.96E−09 |

| Surface No. | F | G | H | J |
|---|---|---|---|---|
| S4 | 9.48E−16 | −1.92E−16 | 2.07E−17 | −9.07E−19 |
| S5 | 4.40E−06 | −2.22E−07 | 5.94E−09 | −6.57E−11 |
| S6 | −3.23E−03 | 6.89E−04 | −7.98E−05 | 3.84E−06 |
| S7 | −1.92E−02 | 4.92E−03 | −6.75E−04 | 3.89E−05 |
| S8 | 2.37E−03 | −2.11E−04 | 8.82E−06 | −1.03E−07 |
| S9 | −2.18E−06 | −4.16E−08 | 4.61E−09 | −8.93E−11 |
| S10 | −4.71E−04 | 1.60E−04 | −2.33E−05 | 1.25E−06 |
| S11 | −5.43E−11 | 3.70E−11 | −1.37E−11 | 2.11E−12 |
| S12 | 2.12E−09 | −4.47E−11 | 7.10E−12 | −1.02E−12 |
| S13 | −8.09E−11 | −7.70E−13 | 4.28E−13 | −5.85E−14 |

Figure 19:
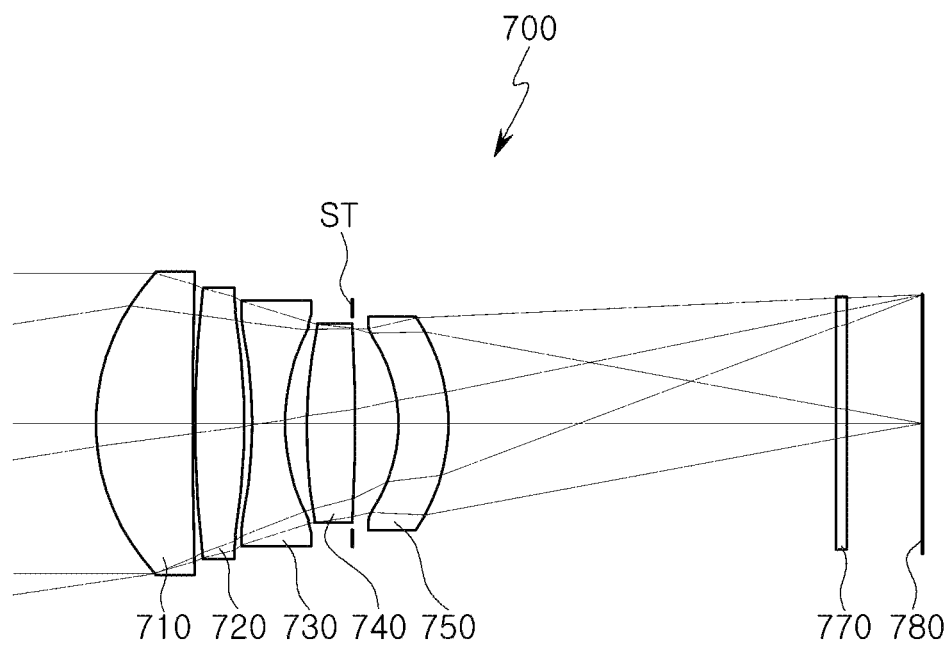
FIG. 19 illustrates a configuration of an optical imaging system according to a seventh example.
Figure 20:
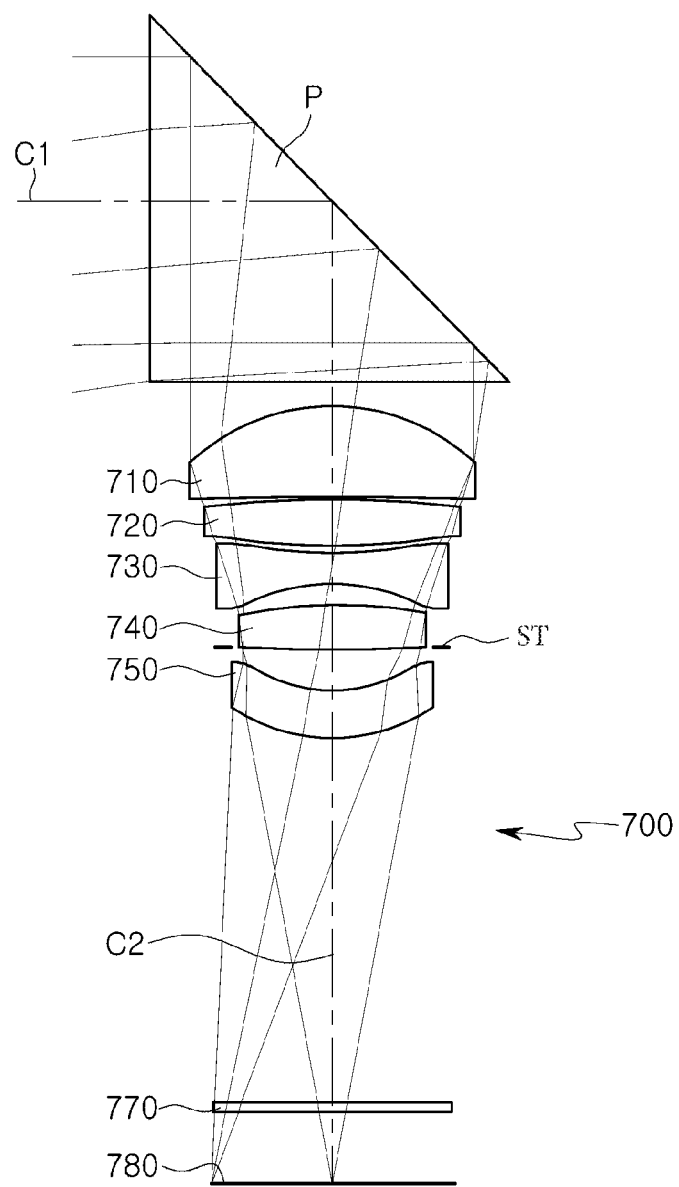
FIG. 20 illustrates a configuration of an optical imaging system including a prism in FIG. 19.

An optical imaging system according to a seventh example will be described with reference to FIGS. 19 and 20.

An optical imaging system 700 includes a prism P, a first lens 710, a second lens 720, a third lens 730, a fourth lens 740, and a fifth lens 750.

The first lens 710 has positive refractive power. The first lens 710 has a shape in which an object-side surface is convex and an image-side surface is convex. The second lens 720 has positive refractive power. The second lens 720 has a shape in which an object-side surface is convex and an image-side surface is convex. The third lens 730 has negative refractive power. The third lens 730 has a shape in which an object-side surface is concave and an image-side surface is concave. The fourth lens 740 has positive refractive power. The fourth lens 740 has a shape in which an object-side surface is convex and an image-side surface is convex. The fifth lens 750 has negative refractive power. The fifth lens 750 has a shape in which an object-side surface is concave and an image-side surface is convex.

The optical imaging system 700 includes a prism P, a stop ST, a filter 770, and an image sensor 780.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 710. The above-configured prism P refracts light, reflected from an object (a subject), to the image sensor 780.

The filter 770 is disposed in front of the image sensor 780 to cut off infrared rays, or the like, included in the incident light. The image sensor 780 includes a plurality of optical sensors. The above-configured image sensor 780 is configured to convert an optical signal into an electrical signal.

Figure 21:
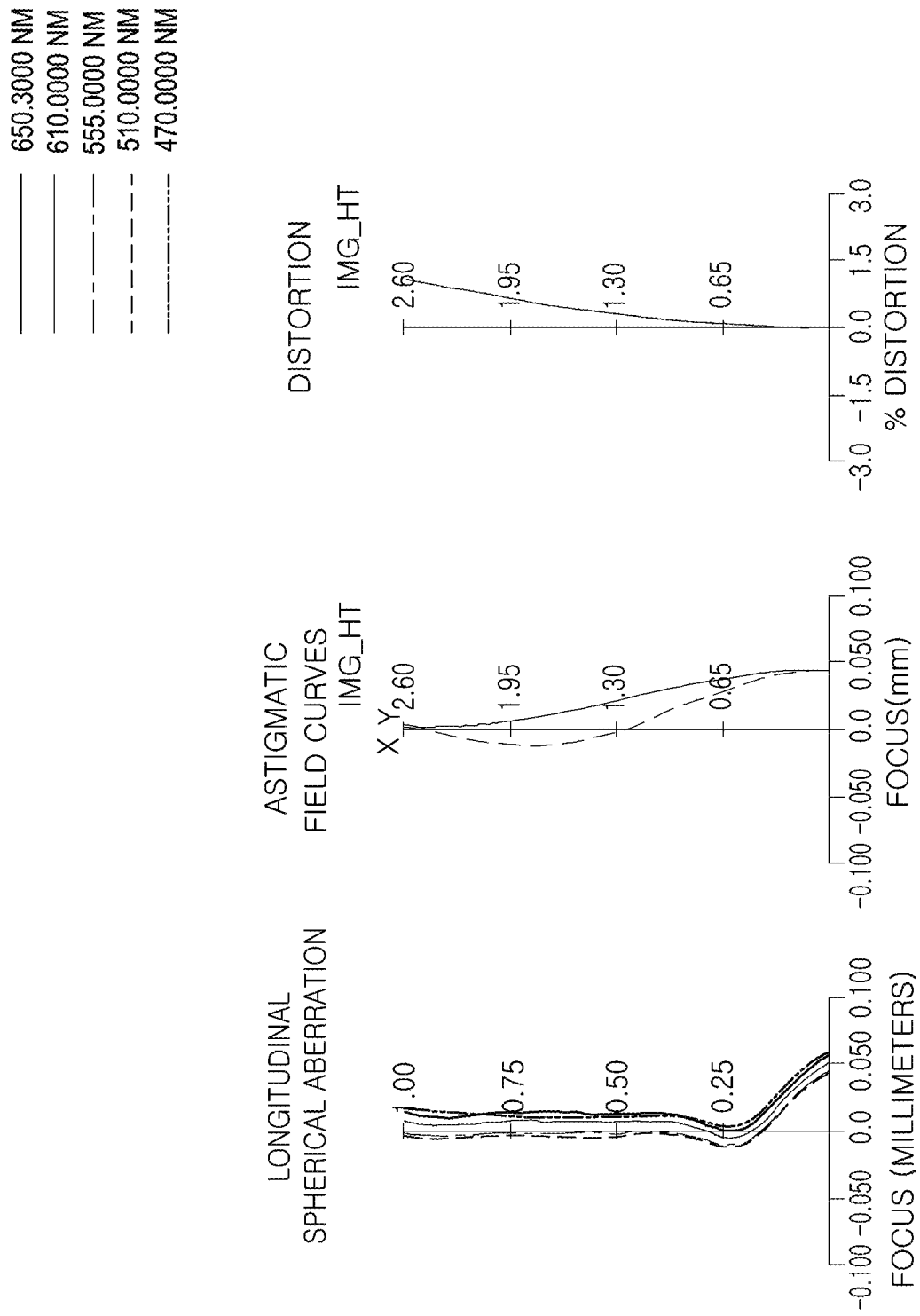
FIG. 21 is aberration curves of the optical imaging system illustrated in FIG. 19.

Table 13 shows lens characteristics of the optical imaging system according to this example, and Table 14 shows aspherical values of the optical imaging system according to this example. FIG. 21 is aberration curves of the above-configured optical imaging system 700.

TABLE 13

| Surface No. | Remark | Radius of Curvature | Thickness/ Distance | Refractive Index | Abbe Number | Focal Length |
|---|---|---|---|---|---|---|
| S1 | Prism | infinity | 4.0000 | 1.722 | 29.500 | |
| S2 | | infinity | 4.0000 | 1.722 | 29.500 | |
| S3 | | infinity | 0.5000 | | | |
| S4 | First Lens | 4.4338 | 2.0000 | 1.536 | 55.656 | 7.341 |
| S5 | | −29.4907 | 0.0300 | | | |
| S6 | Second | 95.2500 | 1.0444 | 1.667 | 20.353 | 5.805 |
| S7 | Lens | −4.0179 | 0.1833 | | | |
| S8 | Third | −2.5361 | 0.6087 | 1.667 | 20.353 | −2.574 |
| S9 | Lens | 5.8198 | 0.4428 | | | |
| S10 | Fourth | 7.7905 | 1.0000 | 1.667 | 20.353 | 9.509 |
| S11(STOP) | Lens | −32.3495 | 0.8958 | | | |
| S12 | Fifth Lens | −3.2650 | 1.0000 | 1.536 | 55.656 | −54.675 |
| S13 | | −4.0670 | 8.0000 | | | |
| S14 | Filter | infinity | 0.2100 | 1.518 | 64.197 | |
| S15 | | infinity | 1.6172 | | | |
| S16 | Imaging plane | infinity | −0.0448 | | | |

TABLE 14

| Surface No. | K | A | B | C | D | E |
|---|---|---|---|---|---|---|
| S4 | −5.05E−02 | 1.77E−16 | −4.51E−16 | 4.41E−16 | −2.23E−16 | 6.48E−17 |
| S5 | 5.13E+01 | 1.23E−02 | −4.04E−03 | 8.99E−04 | −1.29E−04 | 1.17E−05 |
| S6 | −5.90E+01 | 9.68E−03 | −5.25E−03 | 2.60E−03 | −9.00E−04 | 2.05E−04 |
| S7 | −2.57E+01 | 4.80E−04 | 3.62E−03 | 2.35E−03 | −2.60E−03 | 9.61E−04 |
| S8 | −1.30E+01 | 1.96E−02 | −1.96E−03 | 8.78E−04 | −1.21E−03 | 5.38E−04 |
| S9 | 5.06E+00 | 3.87E−02 | −1.94E−02 | 5.16E−03 | −8.92E−04 | 1.02E−04 |
| S10 | 1.03E+01 | −9.42E−03 | 6.49E−03 | −5.45E−03 | 2.85E−03 | −9.95E−04 |
| S11 | −3.53E+01 | −4.29E−16 | 4.44E−15 | −1.20E−14 | 1.66E−14 | −1.32E−14 |
| S12 | 4.44E−01 | 2.56E−03 | 8.35E−05 | 7.86E−06 | −4.84E−07 | 1.93E−09 |
| S13 | 4.41E−01 | 1.74E−03 | 4.89E−05 | −2.97E−06 | 6.05E−08 | −6.95E−10 |

| Surface No. | F | G | H | J |
|---|---|---|---|---|
| S4 | −1.13E−17 | 1.17E−18 | −6.62E−20 | 1.58E−21 |
| S5 | −6.51E−07 | 2.17E−08 | −3.92E−10 | 2.94E−12 |
| S6 | −3.04E−05 | 2.80E−06 | −1.47E−07 | 3.37E−09 |
| S7 | −1.90E−04 | 2.16E−05 | −1.33E−06 | 3.47E−08 |
| S8 | −1.19E−04 | 1.45E−05 | −9.34E−07 | 2.50E−08 |
| S9 | −7.42E−06 | 3.30E−07 | −8.08E−09 | 8.34E−11 |
| S10 | 2.24E−04 | −3.08E−05 | 2.32E−06 | −7.20E−08 |
| S11 | 6.18E−15 | −1.68E−15 | 2.45E−16 | −1.48E−17 |
| S12 | 4.07E−10 | −1.13E−11 | 1.21E−13 | −4.80E−16 |
| S13 | 4.95E−12 | −2.21E−14 | 7.61E−17 | −1.17E−18 |

Figure 22:
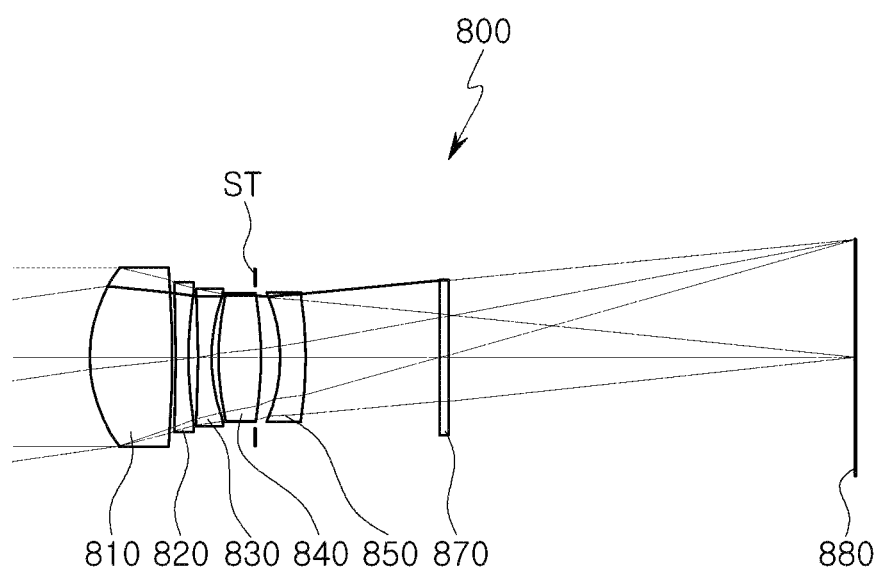
FIG. 22 illustrates a configuration of an optical imaging system according to an eighth example.
Figure 23:
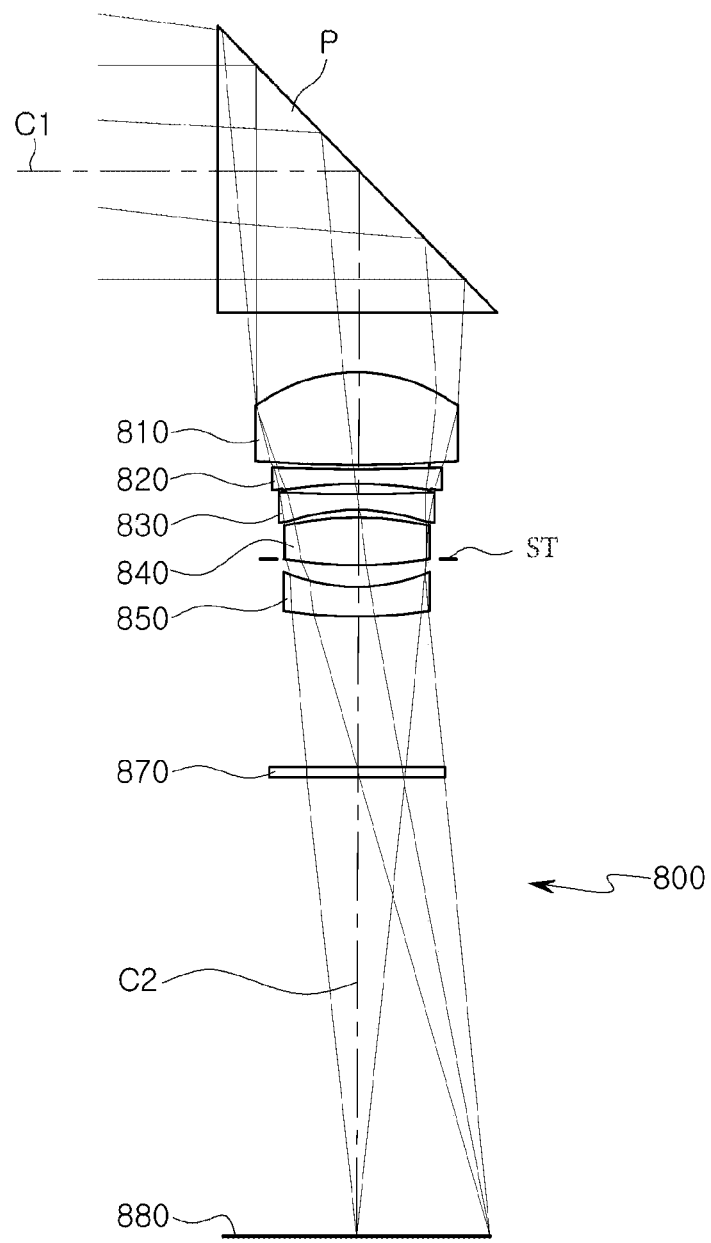
FIG. 23 illustrates a configuration of an optical imaging system including a prism in FIG. 22.

An optical imaging system according to an eighth example will be described with reference to FIGS. 22 and 23.

An optical imaging system 800 includes a prism P, a first lens 810, a second lens 820, a third lens 830, a fourth lens 840, and a fifth lens 850.

The first lens 810 has positive refractive power. The first lens 810 has a shape in which an object-side surface is convex and an image-side surface is convex. The second lens 820 has negative refractive power. The second lens 820 has a shape in which an object-side surface is concave and an image-side surface is concave. The third lens 830 has negative refractive power. The third lens 830 has a shape in which an object-side surface is concave and an image-side surface is concave. The fourth lens 840 has positive refractive power. The fourth lens 840 has a shape in which an object-side surface is convex and an image-side surface is convex. The fifth lens 850 has negative refractive power. The fifth lens 850 has a shape in which an object-side surface is concave and an image-side surface is convex.

The optical imaging system 800 includes a prism P, a stop ST, a filter 870, and an image sensor 880.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 810. The above-configured prism P refracts light, reflected from an object (a subject), to the image sensor 880.

The filter 870 is disposed in front of the image sensor 880 to cut off infrared rays, or the like, included in the incident light. The image sensor 880 includes a plurality of optical sensors. The above-configured image sensor 880 is configured to convert an optical signal into an electrical signal.

Figure 24:
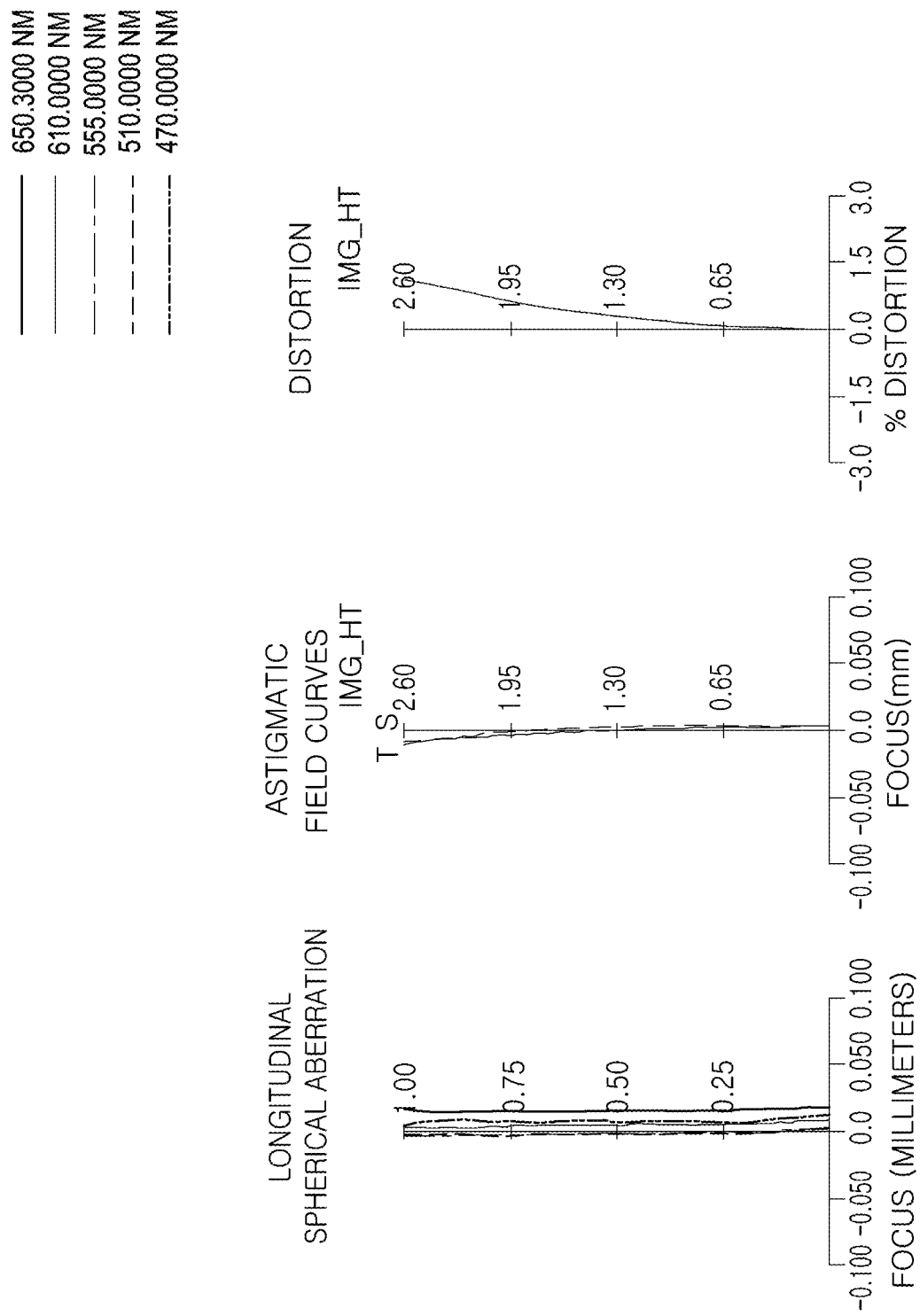
FIG. 24 is aberration curves of the optical imaging system illustrated in FIG. 22.

Table 15 shows lens characteristics of the optical imaging system according to this example, and Table 16 shows aspherical values of the optical imaging system according to this example. FIG. 24 is aberration curves of the above-configured optical imaging system 800.

TABLE 15

| Surface No. | Remark | Radius of Curvature | Thickness/ Distance | Refractive Index | Abbe Number | Focal Length |
|---|---|---|---|---|---|---|
| S1 | Prism | infinity | 2.6000 | 1.722 | 29.500 | |
| S2 | | infinity | 2.6000 | 1.722 | 29.500 | |
| S3 | | infinity | 1.1000 | | | |
| S4 | First Lens | 3.4313 | 1.8523 | 1.536 | 55.656 | 5.433 |
| S5 | | −15.6313 | 0.0753 | | | |
| S6 | Second | −25.2389 | 0.3000 | 1.667 | 20.353 | −16.128 |
| S7 | Lens | 18.8339 | 0.2082 | | | |
| S8 | Third | −10.2055 | 0.3000 | 1.645 | 23.528 | −5.488 |
| S9 | Lens | 5.4763 | 0.1464 | | | |
| S10 | Fourth | 6.9389 | 0.9600 | 1.667 | 20.353 | 6.578 |
| S11(STOP) | Lens | −11.2674 | 0.4686 | | | |
| S12 | Fifth Lens | −2.5067 | 0.5853 | 1.536 | 55.656 | −10.999 |
| S13 | | −4.7160 | 3.0000 | | | |
| S14 | Filter | infinity | 0.2100 | 1.518 | 64.197 | |
| S15 | | infinity | 9.1716 | | | |
| S16 | Imaging plane | infinity | −0.0027 | | | |

TABLE 16

| Surface No. | K | A | B | C | D | E |
|---|---|---|---|---|---|---|
| S4 | 1.81E−01 | 1.41E−15 | −7.68E−15 | 1.64E−14 | −1.84E−14 | 1.21E−14 |
| S5 | 3.13E+01 | 7.81E−03 | −1.58E−03 | 1.40E−04 | 4.92E−06 | −1.77E−06 |
| S6 | 2.51E+01 | 1.09E−02 | 6.17E−03 | −9.74E−03 | 5.68E−03 | −1.89E−03 |
| S7 | 5.90E+01 | 1.06E−02 | 1.97E−02 | −2.47E−02 | 1.19E−02 | −3.32E−03 |
| S8 | −1.61E+00 | 3.45E−02 | −8.07E−03 | −1.08E−02 | 7.80E−03 | −2.30E−03 |
| S9 | 1.07E+01 | 3.02E−02 | −2.44E−02 | 6.83E−03 | −9.50E−04 | 7.03E−05 |
| S10 | 1.80E+01 | −3.20E−03 | −5.10E−03 | 3.11E−03 | −2.73E−03 | 1.14E−03 |
| S11 | 3.62E+01 | −1.85E−14 | 1.98E−13 | −8.29E−13 | 1.84E−12 | −2.44E−12 |
| S12 | −3.75E−01 | 2.93E−02 | −2.55E−03 | 2.28E−04 | −1.39E−05 | 5.45E−07 |
| S13 | 2.57E+00 | 2.71E−02 | −1.22E−03 | 2.84E−05 | −3.89E−07 | 3.28E−09 |

| Surface No. | F | G | H | J |
|---|---|---|---|---|
| S4 | −4.79E−15 | 1.13E−15 | −1.46E−16 | 7.91E−18 |
| S5 | 1.27E−07 | −4.11E−09 | 5.95E−11 | −2.72E−13 |
| S6 | 3.65E−04 | −3.77E−05 | 1.61E−06 | −1.72E−09 |
| S7 | 6.40E−04 | −1.36E−04 | 2.99E−05 | −3.04E−06 |
| S8 | 3.61E−04 | −3.14E−05 | 1.40E−06 | −2.47E−08 |
| S9 | −2.40E−06 | −4.78E−09 | 2.70E−09 | −5.49E−11 |
| S10 | −3.20E−04 | 6.28E−05 | −7.09E−06 | 3.29E−07 |
| S11 | 1.98E−12 | −9.73E−13 | 2.63E−13 | −3.02E−14 |
| S12 | −1.38E−08 | 2.18E−10 | −2.44E−12 | 6.30E−14 |
| S13 | −1.79E−11 | 3.68E−13 | −7.63E−14 | 7.90E−15 |

Figure 25:
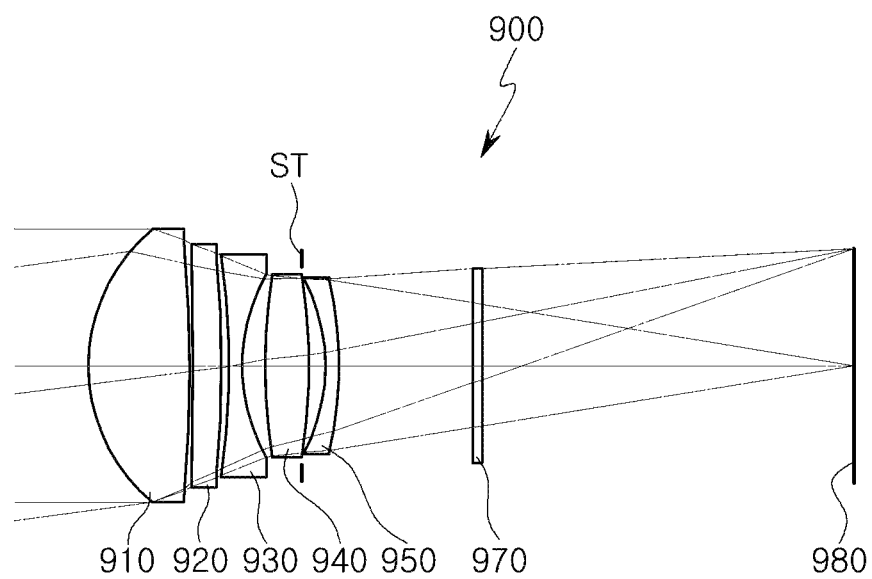
FIG. 25 illustrates a configuration of an optical imaging system according to a ninth example.
Figure 26:
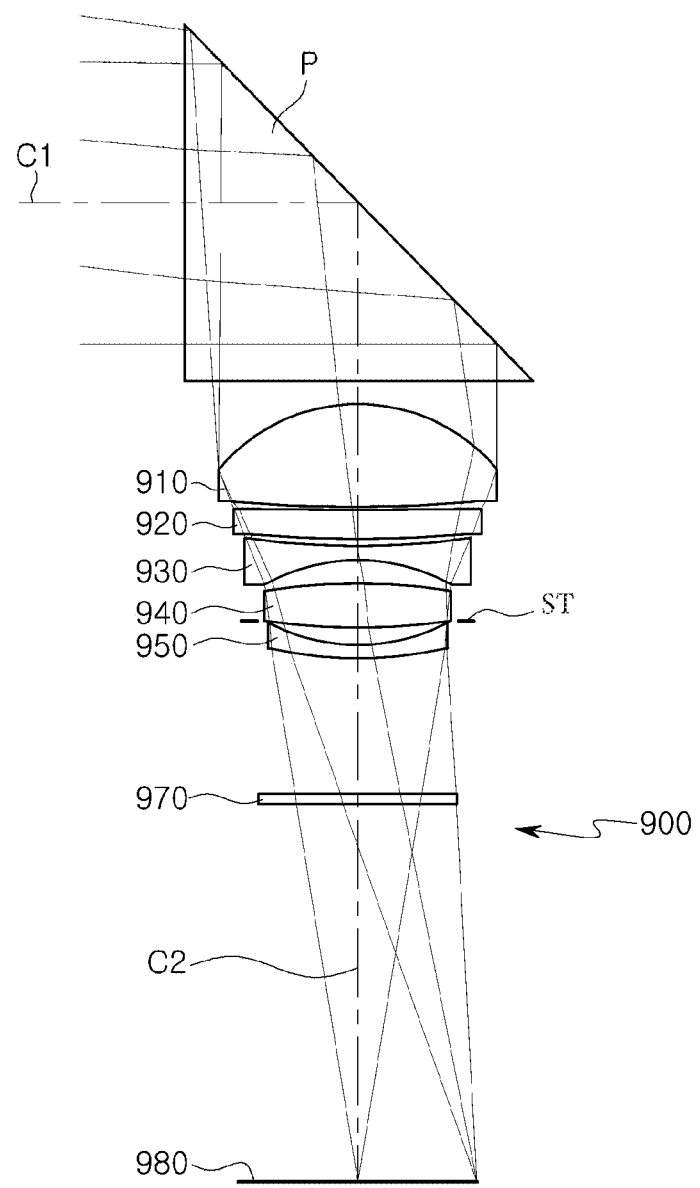
FIG. 26 illustrates a configuration of an optical imaging system including a prism in FIG. 25.

An optical imaging system according to a ninth example will be described with reference to FIGS. 25 and 26.

The optical imaging system 900 includes a prism P, a first lens 910, a second lens 920, a third lens 930, a fourth lens 940, and a fifth lens 950.

The first lens 910 has positive refractive power. The first lens 910 has a shape in which an object-side surface is convex and an image-side surface is convex. The second lens 920 has negative refractive power. The second lens 920 has a shape in which an object-side surface is concave and an image-side surface is convex. The third lens 930 has negative refractive power. The third lens 930 has a shape in which an object-side surface is concave and an image-side surface is concave. The fourth lens 940 has positive refractive power. The fourth lens 940 has a shape in which an object-side surface is convex and an image-side surface is convex. The fifth lens 950 has negative refractive power. The fifth lens 950 has a shape in which an object-side surface is concave and an image-side surface is convex.

The optical imaging system 900 includes a prism P, a stop ST, a filter 970, and an image sensor 980.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 910. The above-configured prism P refracts light, reflected from an object (a subject), to the image sensor 980.

The filter 970 is disposed in front of the image sensor 980 to cut off infrared rays, or the like, included in the incident light. The image sensor 980 includes a plurality of optical sensors. The above-configured image sensor 980 is configured to convert an optical signal into an electrical signal.

Figure 27:
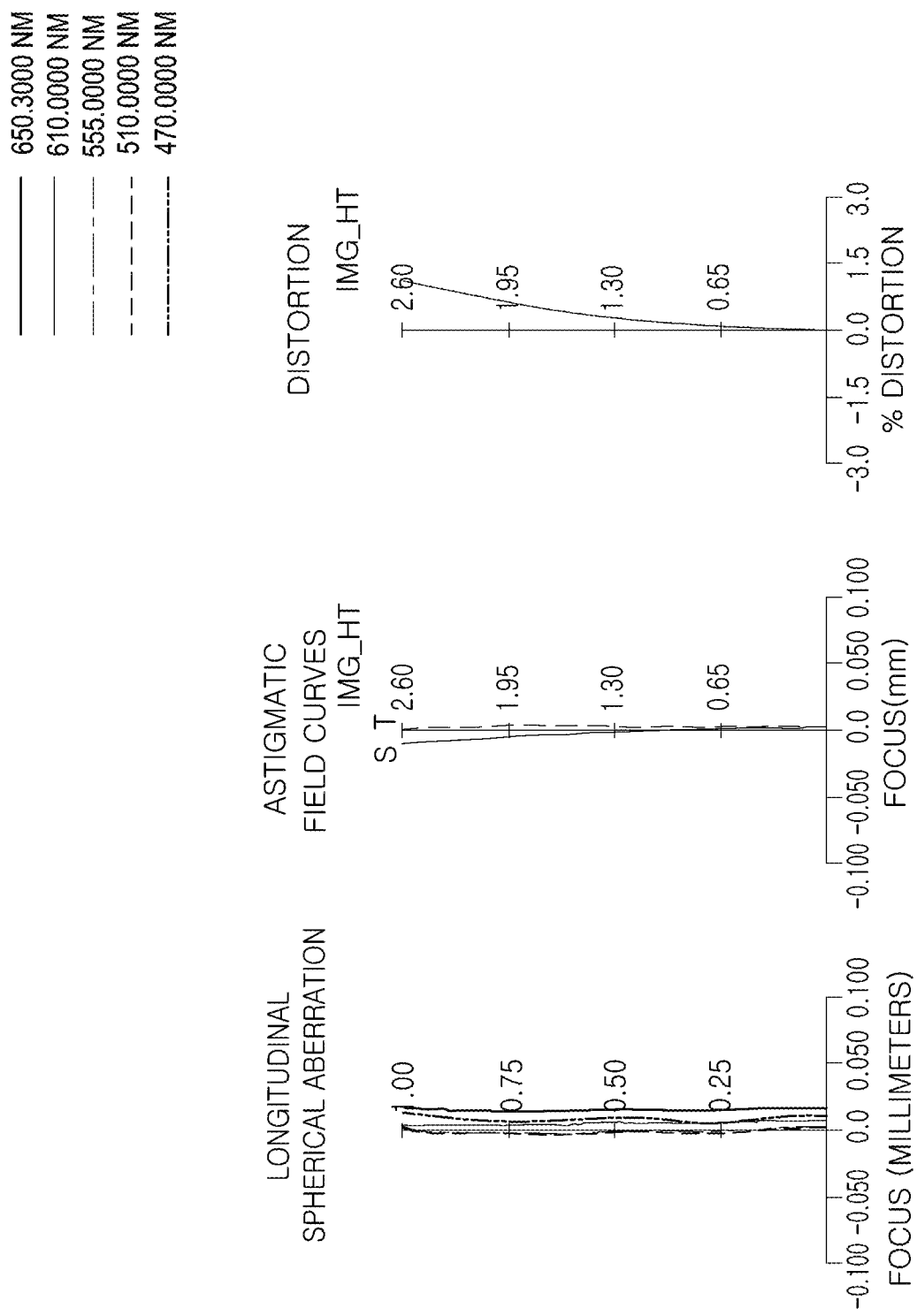
FIG. 27 is aberration curves of the optical imaging system illustrated in FIG. 25.

Table 17 shows lens characteristics of the optical imaging system according to this example, and Table 18 shows aspherical values of the optical imaging system according to this example. FIG. 27 is aberration curves of the above-configured optical imaging system 900.

TABLE 17

| Surface No. | Remark | Radius of Curvature | Thickness/ Distance | Refractive Index | Abbe Number | Focal Length |
|---|---|---|---|---|---|---|
| S1 | Prism | infinity | 4.0000 | 1.722 | 29.500 | |
| S2 | | infinity | 4.0000 | 1.722 | 29.500 | |
| S3 | | infinity | 0.5000 | | | |
| S4 | First Lens | 3.9156 | 2.2691 | 1.536 | 55.656 | 6.058 |
| S5 | | −15.1821 | 0.0300 | | | |
| S6 | Second | −34.1363 | 0.6512 | 1.667 | 20.353 | −999.980 |
| S7 | Lens | −36.2524 | 0.2068 | | | |
| S8 | Third | −5.5565 | 0.3000 | 1.645 | 23.528 | −4.926 |
| S9 | Lens | 7.5663 | 0.4942 | | | |
| S10 | Fourth | 9.5108 | 1.0000 | 1.667 | 20.353 | 9.605 |
| S11(STOP) | Lens | −18.7957 | 0.3891 | | | |
| S12 | Fifth Lens | −2.4862 | 0.3000 | 1.536 | 55.656 | −15.533 |
| S13 | | −3.6938 | 3.0000 | | | |
| S14 | Filter | infinity | 0.2100 | 1.518 | 64.197 | |
| S15 | | infinity | 8.4226 | | | |
| S16 | Imaging plane | infinity | −0.0018 | | | |

TABLE 18

| Surface No. | K | A | B | C | D | E |
|---|---|---|---|---|---|---|
| S4 | −5.62E−02 | −1.03E−16 | 2.10E−16 | −1.89E−16 | 9.61E−17 | −2.95E−17 |
| S5 | 9.56E+00 | 6.94E−03 | −1.51E−03 | 2.61E−04 | −4.26E−05 | 5.90E−06 |
| S6 | 4.57E+01 | 9.61E−03 | −1.73E−03 | 4.74E−04 | −3.03E−04 | 1.06E−04 |
| S7 | −5.21E+00 | 9.07E−03 | −2.30E−04 | 1.93E−04 | −9.76E−04 | 4.57E−04 |
| S8 | −1.55E+01 | 7.88E−03 | 1.09E−03 | −1.13E−03 | 1.67E−04 | 1.51E−05 |
| S9 | 1.06E+01 | 4.87E−03 | −1.94E−04 | 1.00E−03 | −2.99E−04 | 3.86E−05 |
| S10 | 1.70E+01 | −9.16E−03 | 5.46E−04 | 7.70E−04 | −5.30E−04 | 1.47E−04 |
| S11 | 5.90E+01 | 3.12E−15 | −1.82E−14 | 3.69E−14 | −3.92E−14 | 2.53E−14 |
| S12 | −3.31E−01 | 3.69E−02 | −3.90E−03 | 3.55E−04 | −2.04E−05 | 7.40E−07 |
| S13 | −6.89E−01 | 3.12E−02 | −3.31E−03 | 1.21E−04 | −2.31E−06 | 2.60E−08 |

| Surface No. | F | G | H | J |
|---|---|---|---|---|
| S4 | 5.53E−18 | −6.12E−19 | 3.68E−20 | −9.22E−22 |
| S5 | −5.11E−07 | 2.46E−08 | −6.08E−10 | 6.01E−12 |
| S6 | −2.07E−05 | 2.34E−06 | −1.44E−07 | 3.70E−09 |
| S7 | −9.85E−05 | 1.16E−05 | −7.35E−07 | 1.97E−08 |
| S8 | −6.06E−06 | 6.05E−07 | −2.62E−08 | 4.25E−10 |
| S9 | −2.67E−06 | 1.04E−07 | −2.14E−09 | 1.82E−11 |
| S10 | −2.07E−05 | 9.74E−07 | 6.21E−08 | −5.54E−09 |
| S11 | −1.03E−14 | 2.59E−15 | −3.66E−16 | 2.21E−17 |
| S12 | −1.70E−08 | 2.42E−10 | −1.96E−12 | 7.02E−15 |
| S13 | −1.79E−10 | 7.44E−13 | −2.22E−15 | 3.02E−17 |

Figure 28:
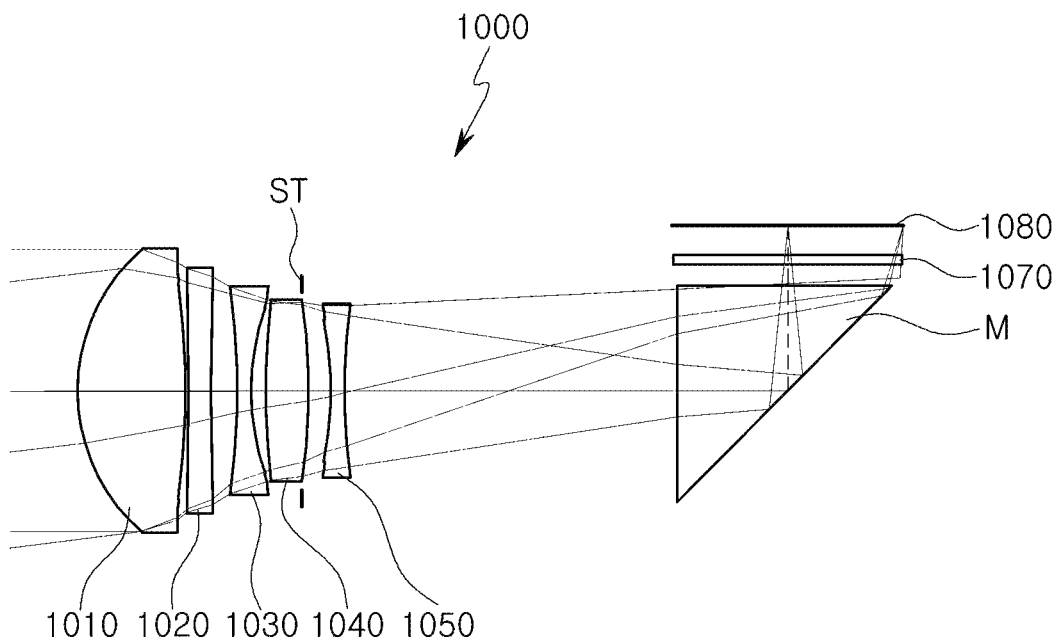
FIG. 28 illustrates a configuration of an optical imaging system according to a tenth example.
Figure 29:
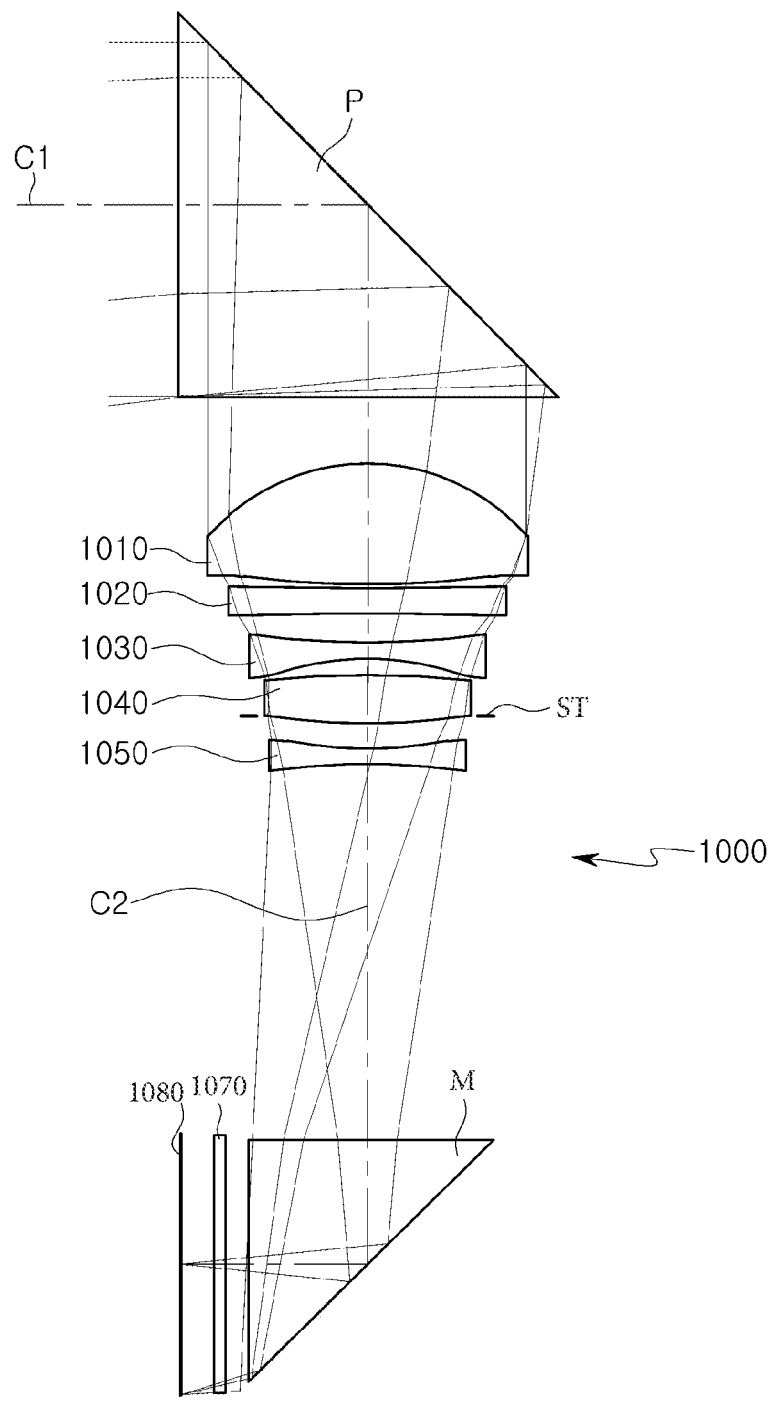
FIG. 29 illustrates a configuration of an optical imaging system including a prism in FIG. 28.

An optical imaging system according to a tenth example will be described with reference to FIGS. 28 and 29.

An optical imaging system 1000 includes a prism P, a first lens 1010, a second lens 1020, a third lens 1030, a fourth lens 1040, and a fifth lens 1050.

The first lens 1010 has positive refractive power. The first lens 1010 has a shape in which an object-side surface is convex and an image-side surface is convex. The second lens 1020 has negative refractive power. The second lens 1020 has a shape in which an object-side surface is concave and an image-side surface is convex. The third lens 1030 has negative refractive power. The third lens 1030 has a shape in which an object-side surface is concave and an image-side surface is concave. The fourth lens 1040 has positive refractive power. The fourth lens 1040 has a shape in which an object-side surface is convex and an image-side surface is convex. The fifth lens 1050 has negative refractive power. The fifth lens 1050 has a shape in which an object-side surface is concave and an image-side surface is convex.

The optical imaging system 1000 includes a prism P, a stop ST, a filter 1070, a reflective member M, and an image sensor 1080.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 1010. The above-configured prism P refracts light, reflected from an object (a subject), to the reflective member M. The reflective member M reflects or refracts light, incident through the prism P, to the image sensor 1080.

The filter 1070 is disposed in front of the image sensor 1080 to cut off infrared rays, or the like, included in the incident light. The image sensor 1080 includes a plurality of optical sensors. The above-configured image sensor 1080 is configured to convert an optical signal into an electrical signal.

Figure 30:
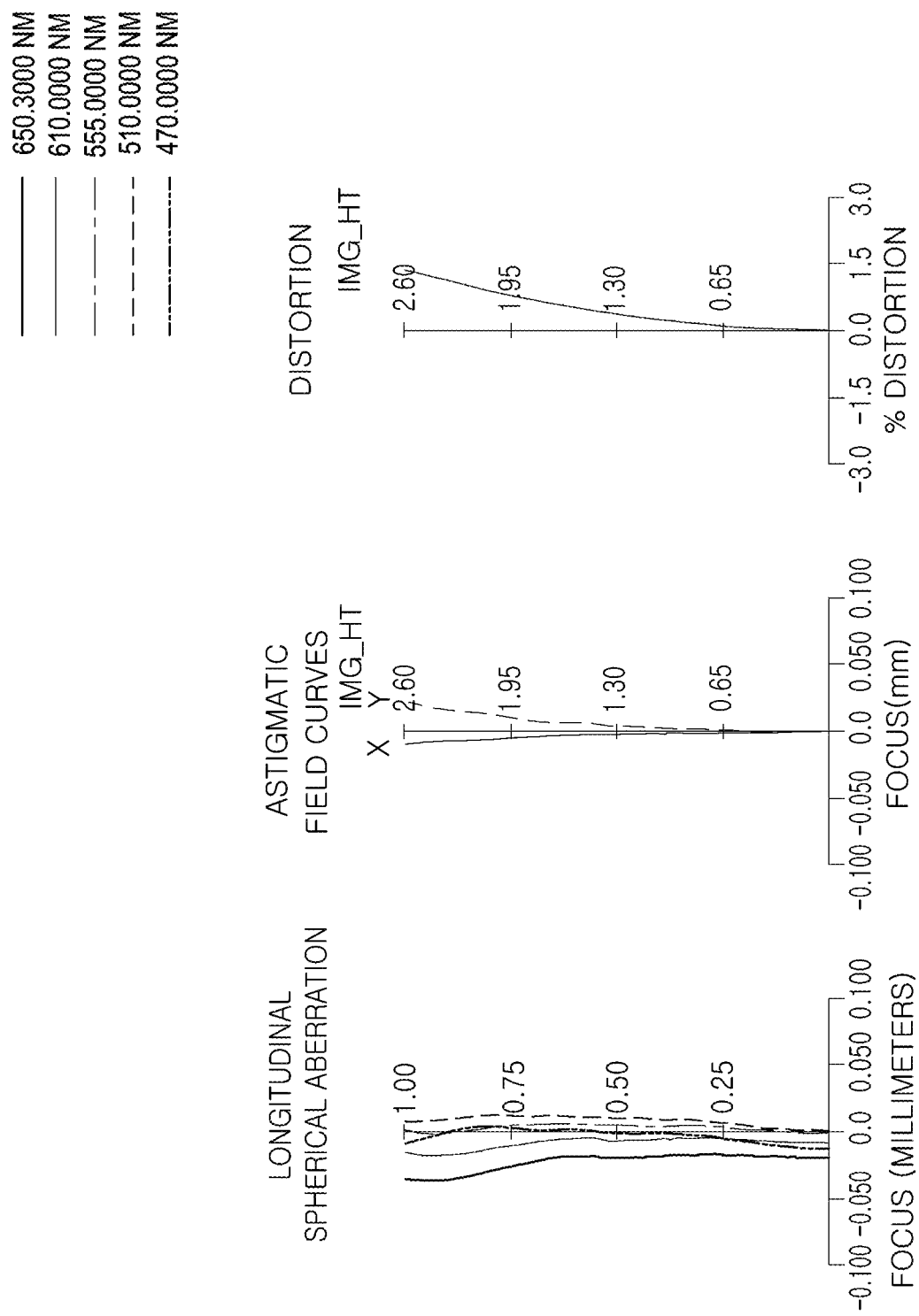
FIG. 30 is aberration curves of the optical imaging system illustrated in FIG. 28.

Table 19 shows lens characteristics of the optical imaging system according to this example, and Table 20 shows aspherical values of the optical imaging system according to this example. FIG. 30 is aberration curves of the above-configured optical imaging system 1000.

TABLE 19

| Surface No. | Remark | Radius of Curvature | Thickness/ Distance | Refractive Index | Abbe Number | Focal Length |
|---|---|---|---|---|---|---|
| S1 | Prism | infinity | 3.9000 | 1.722 | 29.500 | |
| S2 | | infinity | 3.9000 | 1.722 | 29.500 | |
| S3 | | infinity | 0.5000 | | | |
| S4 | First Lens | 4.2499 | 2.4175 | 1.536 | 55.656 | 6.254 |
| S5 | | −12.7240 | 0.0582 | | | |
| S6 | Second | −35.8161 | 0.5164 | 1.667 | 20.353 | −59.041 |
| S7 | Lens | −398.4523 | 0.6120 | | | |
| S8 | Third | −6.7886 | 0.3000 | 1.645 | 23.528 | −6.014 |
| S9 | Lens | 9.1946 | 0.3200 | | | |
| S10 | Fourth | 11.9999 | 0.9458 | 1.667 | 20.353 | 10.909 |
| S11(STOP) | Lens | −17.8981 | 0.5364 | | | |
| S12 | Fifth Lens | −4.6645 | 0.3000 | 1.536 | 55.656 | −10.800 |
| S13 | | −24.5417 | 7.5000 | | | |
| S14 | reflective | infinity | 2.5000 | 1.722 | 29.500 | |
| S15 | member | infinity | 2.3000 | 1.722 | 29.500 | |
| S16 | | infinity | 0.5000 | | | |
| S17 | Filter | infinity | 0.2100 | 1.518 | 64.197 | |
| S18 | | infinity | 0.6507 | | | |
| S19 | Imaging plane | infinity | −0.0007 | | | |

TABLE 20

| Surface No. | K | A | B | C | D | E |
|---|---|---|---|---|---|---|
| S4 | 9.18E−03 | 1.02E−15 | −2.14E−15 | 1.75E−15 | −7.54E−16 | 1.91E−16 |
| S5 | 8.28E+00 | −4.46E−03 | 4.69E−04 | −5.59E−05 | 1.15E−05 | −2.23E−06 |
| S6 | 5.90E+01 | −5.64E−03 | 4.52E−04 | 2.49E−05 | 2.50E−05 | −6.59E−06 |
| S7 | −5.90E+01 | −5.88E−03 | 2.32E−04 | 2.37E−04 | −4.24E−05 | 2.48E−05 |
| S8 | −1.55E+01 | −4.21E−03 | 1.41E−03 | −1.30E−03 | 5.25E−04 | −1.11E−04 |
| S9 | 1.49E+01 | 1.85E−03 | 9.09E−04 | −1.55E−03 | 3.76E−04 | −4.27E−05 |
| S10 | 1.98E+01 | 7.41E−03 | −3.31E−04 | 6.33E−04 | −6.59E−04 | 2.93E−04 |
| S11 | 5.90E+01 | −1.29E−16 | 7.91E−16 | −1.93E−15 | 2.49E−15 | −1.87E−15 |
| S12 | 1.74E+00 | −2.40E−02 | 2.19E−03 | −2.10E−04 | 1.34E−05 | −5.49E−07 |
| S13 | −1.71E+01 | −2.39E−02 | 2.74E−03 | −1.01E−04 | 1.92E−06 | −2.13E−08 |

| Surface No. | F | G | H | J |
|---|---|---|---|---|
| S4 | −2.91E−17 | 2.65E−18 | −1.31E−19 | 2.73E−21 |
| S5 | 2.23E−07 | −1.13E−08 | 2.82E−10 | −2.76E−12 |
| S6 | 4.48E−07 | −6.27E−11 | −6.15E−10 | −8.68E−13 |
| S7 | −9.05E−06 | 1.45E−06 | −1.10E−07 | 3.25E−09 |
| S8 | 1.30E−05 | −8.48E−07 | 2.87E−08 | −3.89E−10 |
| S9 | 2.69E−06 | −9.65E−08 | 1.85E−09 | −1.48E−11 |
| S10 | −6.99E−05 | 9.59E−06 | −7.01E−07 | 2.08E−08 |
| S11 | 8.49E−16 | −2.28E−16 | 3.34E−17 | −2.06E−18 |

TABLE 20-continued

| S12 | 1.42E−08 | −2.27E−10 | 2.03E−12 | −7.86E−15 |
| S13 | 1.45E−10 | −5.94E−13 | 1.87E−15 | −3.07E−17 |

Figure 31:
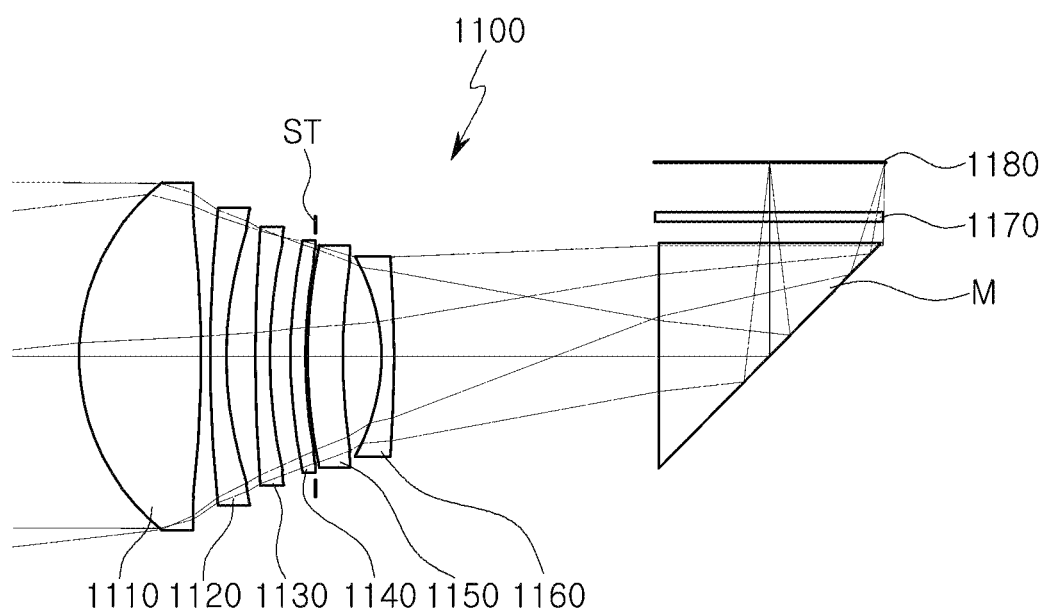
FIG. 31 illustrates a configuration of an optical imaging system according to an eleventh example.
Figure 32:
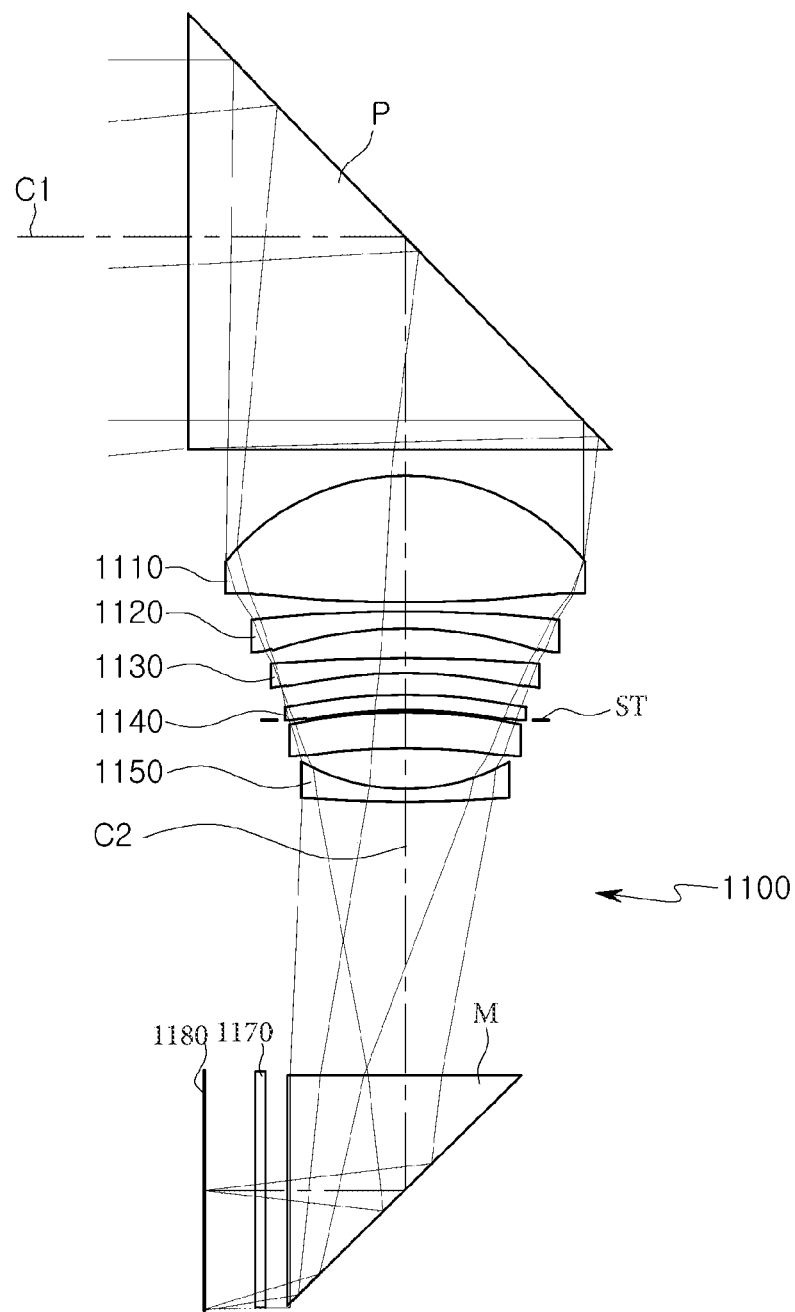
FIG. 32 illustrates a configuration of an optical imaging system including a prism in FIG.

An optical imaging system according to an eleventh example will be described with reference to FIGS. 31 and 32.

An optical imaging system 1100 includes a prism P, a first lens 1110, a second lens 1120, a third lens 1130, a fourth lens 1140, a fifth lens 1150, and a sixth lens 1160.

The first lens 1110 has positive refractive power. The first lens 1110 has a shape in which an object-side surface is convex and an image-side surface is convex. The second lens 1120 has negative refractive power. The second lens 1120 has a shape in which an object-side surface is concave and an image-side surface is concave. The third lens 1130 has negative refractive power. The third lens 1130 has a shape in which an object-side surface is concave and an image-side surface is concave. The fourth lens 1140 has negative refractive power. The fourth lens 1140 has a shape in which an object-side surface is convex and an image-side surface is concave. The fifth lens 1150 has positive refractive power. The fifth lens 1150 has a shape in which an object-side surface is convex and an image-side surface is concave. The sixth lens 1160 has negative refractive power. The sixth lens 1160 has a shape in which an object-side surface is concave and an image-side surface is convex.

The optical imaging system 1100 includes a prism P1, a stop ST, a filter 1170, a reflective member M, and an image sensor 1180.

The optical imaging system includes a prism P as a means for folding or refracting the optical path. The prism P folds light, incident in a direction of a first optical axis C1, in a direction of a second optical axis C2. The second optical axis C2, folded by the prism P, may have a substantially right angle to the first optical axis C1. The prism P is disposed on the object-side of the first lens 1110. The above-configured prism P refracts light, reflected from an object (a subject), to the reflective member M. The reflective member M reflects or refracts light, incident through the prism P, to the image sensor 1180.

The filter 1170 is disposed in front of the image sensor 1180 to cut off infrared rays, or the like, included in the incident light. The image sensor 1180 includes a plurality of optical sensors. The above-configured image sensor 1180 is configured to convert an optical signal into an electrical signal.

Figure 33:
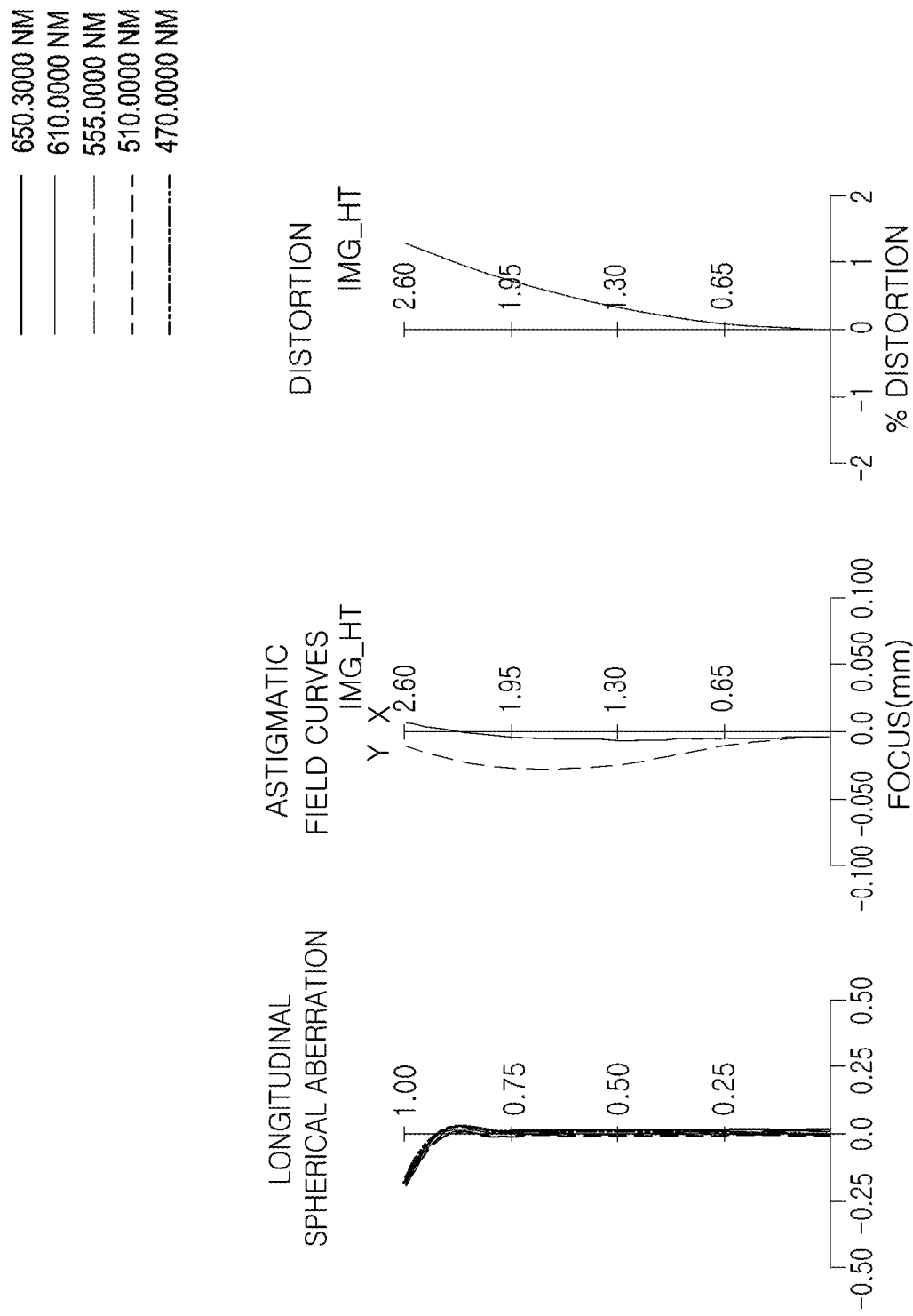
FIG. 33 is aberration curves of the optical imaging system illustrated in FIG. 31.

Table 21 shows lens characteristics of the optical imaging system according to this example, and Table 22 shows aspherical values of the optical imaging system according to this example. FIG. 33 is aberration curves of the above-configured optical imaging system 1100.

TABLE 21

| Surface No. | Remark | Radius of Curvature | Thickness/ Distance | Refractive Index | Abbe Number | Focal Length |
| --- | --- | --- | --- | --- | --- | --- |
| S1 | Prism | infinity | 4.8000 | 1.722 | 29.500 | |
| S2 | | infinity | 4.8000 | 1.722 | 29.500 | |
| S3 | | infinity | 0.5000 | | | |
| S4 | First Lens | 4.6948 | 2.7274 | 1.536 | 55.656 | 6.901 |
| S5 | | −13.9109 | 0.2166 | | | |
| S6 | Second | −357.0849 | 0.3731 | 1.667 | 20.353 | −16.950 |
| S7 | Lens | 11.6786 | 0.6485 | | | |
| S8 | Third | −57.6337 | 0.3000 | 1.645 | 23.528 | −15.639 |
| S9 | Lens | 12.2427 | 0.5063 | | | |
| S10 | Fourth | 14.5521 | 0.3000 | 1.536 | 55.656 | −27.162 |
| S11 | Lens | 7.2911 | 0.0300 | | | |
| S12(STOP) | Fifth Lens | 6.6151 | 0.8489 | 1.667 | 20.353 | 14.941 |
| S13 | | 18.6703 | 0.8257 | | | |
| S14 | Sixth | −5.6697 | 0.3000 | 1.536 | 55.656 | −14.671 |
| S15 | Lens | −19.7725 | 6.0000 | | | |
| S16 | Reflective | infinity | 2.5000 | 1.722 | 29.500 | |
| S17 | member | infinity | 2.5000 | 1.722 | 29.500 | |
| S18 | | infinity | 0.5000 | | | |
| S19 | Filter | infinity | 0.2100 | 1.518 | 64.197 | |
| S20 | | infinity | 1.0980 | | | |
| S21 | Imaging plane | infinity | 0.0020 | | | |

TABLE 22

| Surface No. | K | A | B | C | D | E |
| --- | --- | --- | --- | --- | --- | --- |
| S4 | −1.72E−01 | 4.33E−16 | −5.62E−16 | 2.71E−16 | −6.62E−17 | 9.14E−18 |
| S5 | −1.3E+00 | 5.62E−04 | 7.78E−04 | −1.65E−04 | 1.73E−05 | −1.06E−06 |
| S6 | −5.9E+01 | −2.22E−03 | 1.23E−03 | 2.62E−04 | −1.92E−04 | 4.21E−05 |
| S7 | −2.9E+01 | 8.68E−04 | −3.72E−04 | 1.16E−03 | −4.34E−04 | 7.01E−05 |
| S8 | 6.1E+00 | −1.10E−03 | 1.16E−03 | 8.73E−04 | −5.67E−04 | 1.40E−04 |
| S9 | 1.6E+01 | −9.48E−03 | 4.49E−03 | −1.07E−03 | 1.32E−04 | −8.87E−06 |
| S10 | 2.7E+01 | −1.47E−02 | 8.31E−03 | −3.61E−03 | 1.22E−03 | −2.85E−04 |
| S11 | −4.9E+01 | −1.60E−15 | 5.13E−15 | −6.68E−15 | 4.66E−15 | −1.92E−15 |
| S12 | −1.1E+01 | −1.97E−03 | −1.78E−04 | 3.62E−05 | −1.86E−06 | 4.90E−08 |
| S13 | −1.9E+00 | −1.12E−15 | 5.30E−15 | −7.76E−15 | 5.55E−15 | −2.27E−15 |

TABLE 22-continued

| | | | | | | |
|---|---|---|---|---|---|---|
| S14 | 3.7E+00 | 3.16E−16 | −1.77E−15 | 3.00E−15 | −2.57E−15 | 1.25E−15 |
| S15 | −5.9E+01 | 1.49E−17 | −7.86E−17 | 1.40E−16 | −1.14E−16 | 4.90E−17 |

| Surface No. | F | G | H | J |
|---|---|---|---|---|
| S4 | −7.44E−19 | 3.50E−20 | −8.72E−22 | 8.69E−24 |
| S5 | 3.97E−08 | −8.92E−10 | 1.12E−11 | −6.10E−14 |
| S6 | −5.02E−06 | 3.53E−07 | −1.39E−08 | 2.38E−10 |
| S7 | −5.09E−06 | 6.52E−08 | 1.10E−08 | −4.30E−10 |
| S8 | −1.84E−05 | 1.35E−06 | −5.25E−08 | 8.38E−10 |
| S9 | 3.47E−07 | −7.86E−09 | 9.62E−11 | −4.93E−13 |
| S10 | 4.17E−05 | −3.59E−06 | 1.65E−07 | −3.11E−09 |
| S11 | 4.81 E−16 | −7.21E−17 | 5.95E−18 | −2.08E−19 |
| S12 | −7.48E−10 | 6.72E−12 | −3.30E−14 | 6.90E−17 |
| S13 | 5.65E−16 | −8.54E−17 | 7.24E−18 | −2.65E−19 |
| S14 | −3.62E−16 | 6.14E−17 | −5.64E−18 | 2.15E−19 |
| S15 | −1.19E−17 | 1.60E−18 | −1.08E−19 | 2.72E−21 |

Table 23 show optical characteristics of the optical imaging systems according to the first to eleventh examples.

TABLE 23

| Example | f | f-number | IMG-HT | FOV | 2θ | AL1 | BFL | TTL | PTTL |
|---|---|---|---|---|---|---|---|---|---|
| 1 | 13.00 | 2.955 | 2.60 | 22.396 | 91.15 | 12.345 | 5.850 | 11.700 | 16.100 |
| 2 | 14.00 | 2.955 | 2.60 | 20.811 | 91.15 | 12.345 | 4.997 | 12.493 | 16.893 |
| 3 | 15.00 | 3.125 | 2.60 | 19.362 | 91.15 | 14.691 | 2.035 | 12.963 | 17.463 |
| 4 | 15.00 | 3.078 | 2.60 | 19.178 | 91.15 | 14.691 | 0.940 | 11.967 | 15.867 |
| 5 | 19.00 | 3.792 | 2.60 | 15.477 | 91.15 | 16.013 | 9.652 | 16.150 | 20.450 |
| 6 | 15.35 | 3.838 | 2.60 | 19.068 | 91.15 | 10.202 | 8.481 | 14.283 | 17.033 |
| 7 | 17.00 | 2.787 | 2.60 | 17.267 | 91.15 | 23.727 | 9.782 | 16.987 | 21.487 |
| 8 | 19.36 | 4.841 | 2.60 | 15.136 | 91.15 | 10.202 | 12.379 | 17.275 | 20.975 |
| 9 | 19.19 | 3.146 | 2.60 | 15.270 | 91.15 | 23.727 | 11.631 | 17.271 | 21.771 |
| 10 | 21.85 | 3.469 | 2.60 | 13.391 | 91.15 | 25.308 | 13.660 | 19.666 | 24.066 |
| 11 | 22.10 | 2.863 | 2.60 | 13.253 | 91.15 | 37.929 | 12.810 | 19.886 | 25.186 |

Table 24 shows effective major axis radii [mm] of the lenses according to the respective examples, and Table 25 shows effective minor axis radii [mm] of the lenses according to the respective examples.

TABLE 24

| Example | L1S1el | L1S2el | L2S1el | L2S2el | L3S1el | L3S2el | L4S1el | L4S2el | L5S1el | L5S2el | L6S1el | L6S2el |
|---|---|---|---|---|---|---|---|---|---|---|---|---|
| 1 | 2.200 | 2.052 | 1.838 | 1.610 | 1.592 | 1.297 | 1.246 | 1.286 | 1.658 | 1.713 | 1.765 | 1.786 |
| 2 | 2.200 | 2.198 | 1.898 | 1.679 | 1.657 | 1.334 | 1.291 | 1.321 | 1.639 | 1.685 | 2.073 | 2.096 |
| 3 | 2.400 | 2.012 | 1.731 | 1.644 | 1.623 | 1.400 | 1.378 | 1.323 | 1.285 | 1.307 | 1.800 | 2.368 |
| 4 | 2.400 | 2.026 | 1.685 | 1.604 | 1.554 | 1.400 | 1.289 | 1.231 | 1.153 | 1.164 | 1.700 | 2.540 |
| 5 | 2.506 | 2.423 | 2.352 | 2.270 | 2.252 | 2.000 | 1.999 | 2.005 | 2.025 | 2.010 | 1.790 | 1.878 |
| 6 | 2.000 | 1.695 | 1.674 | 1.540 | 1.526 | 1.336 | 1.286 | 1.151 | 1.172 | 1.336 | | |
| 7 | 3.050 | 2.808 | 2.744 | 2.560 | 2.478 | 2.028 | 2.021 | 1.916 | 1.909 | 2.143 | | |
| 8 | 2.000 | 1.716 | 1.652 | 1.545 | 1.533 | 1.429 | 1.431 | 1.381 | 1.372 | 1.442 | | |
| 9 | 3.050 | 2.794 | 2.693 | 2.503 | 2.455 | 2.038 | 2.029 | 1.948 | 1.945 | 1.981 | | |
| 10 | 3.150 | 2.867 | 2.725 | 2.541 | 2.283 | 2.004 | 1.995 | 1.920 | 1.866 | 1.843 | | |
| 11 | 3.856 | 3.618 | 3.267 | 2.986 | 2.834 | 2.650 | 2.565 | 2.483 | 2.454 | 2.257 | 2.206 | 2.244 |

TABLE 25

| Example | L1S1es | L1S2es | L2S1es | L2S2es | L3S1es | L3S2es | L4S1es | L4S2es | L5S1es | L5S2es | L6S1es | L6S2es |
|---|---|---|---|---|---|---|---|---|---|---|---|---|
| 1 | 1.540 | 1.436 | 1.286 | 1.127 | 1.115 | 0.908 | 0.872 | 1.249 | 1.391 | 1.413 | 1.424 | 1.426 |
| 2 | 1.540 | 1.539 | 1.328 | 1.175 | 1.160 | 0.934 | 0.904 | 1.288 | 1.399 | 1.416 | 1.543 | 1.548 |
| 3 | 1.680 | 1.408 | 1.212 | 1.151 | 1.136 | 1.388 | 0.964 | 0.926 | 1.253 | 1.254 | 1.477 | 1.761 |
| 4 | 1.680 | 2.023 | 1.179 | 1.122 | 1.088 | 1.311 | 0.902 | 0.862 | 1.133 | 1.135 | 1.316 | 1.788 |
| 5 | 1.754 | 1.696 | 1.647 | 1.589 | 1.577 | 1.400 | 1.990 | 1.979 | 1.987 | 1.965 | 1.641 | 1.698 |
| 6 | 1.400 | 1.186 | 1.172 | 1.539 | 1.525 | 1.335 | 1.284 | 0.806 | 1.157 | 1.245 | | |
| 7 | 2.135 | 1.966 | 1.921 | 1.792 | 1.735 | 1.420 | 1.415 | 1.341 | 1.866 | 2.031 | | |
| 8 | 1.400 | 1.201 | 1.156 | 1.082 | 1.073 | 1.000 | 1.002 | 0.967 | 1.348 | 1.379 | | |
| 9 | 2.135 | 1.956 | 1.885 | 1.752 | 1.719 | 1.426 | 1.421 | 1.364 | 1.942 | 1.946 | | |
| 10 | 2.205 | 2.007 | 1.907 | 1.778 | 1.598 | 1.403 | 1.396 | 1.344 | 1.826 | 1.772 | | |
| 11 | 2.699 | 2.533 | 2.287 | 2.090 | 1.984 | 1.855 | 2.539 | 2.446 | 2.413 | 2.198 | 2.106 | 2.101 |

Tables 26 and 27 show conditional expressions values of the optical imaging systems according to the first to eleventh examples. As can be seen from Tables 26 and 27, the optical imaging systems according to the first to eleventh examples satisfy all of the above-mentioned conditional expressions.

TABLE 26

| Example | L1S1es/L1S1el | L1S2es/L1S2el | L2S1es/L2S1el | L2S2es/L2S2el | DPL1 | SPY2/SPX2 | L1S1el/IMG_HT |
|---|---|---|---|---|---|---|---|
| 1 | 0.70 | 0.700 | 0.70 | 0.700 | 1.00 | 0.700 | 0.846 |
| 2 | 0.70 | 0.700 | 0.70 | 0.700 | 1.00 | 0.700 | 0.846 |
| 3 | 0.70 | 0.700 | 0.70 | 0.700 | 1.00 | 0.700 | 0.923 |
| 4 | 0.70 | 0.998 | 0.70 | 0.700 | 0.50 | 0.700 | 0.923 |
| 5 | 0.70 | 0.700 | 0.70 | 0.700 | 0.80 | 0.700 | 0.964 |
| 6 | 0.70 | 0.700 | 0.70 | 0.999 | 0.05 | 0.700 | 0.769 |
| 7 | 0.70 | 0.700 | 0.70 | 0.700 | 0.50 | 0.700 | 1.173 |
| 8 | 0.70 | 0.700 | 0.70 | 0.700 | 1.10 | 0.700 | 0.769 |
| 9 | 0.70 | 0.700 | 0.70 | 0.700 | 0.50 | 0.700 | 1.173 |
| 10 | 0.70 | 0.700 | 0.70 | 0.700 | 0.50 | 0.700 | 1.212 |
| 11 | 0.70 | 0.700 | 0.70 | 0.700 | 0.50 | 0.700 | 1.483 |

TABLE 27

| Example | L1S1el/PTTL | L1S1es/PTTL | L2S1el/PTTL | L2S1es/PTTL | AL1/(PTTL)$^2$ | 2θ/FOV | BFL/2IMG_HT |
|---|---|---|---|---|---|---|---|
| 1 | 0.1366 | 0.0957 | 0.1141 | 0.0799 | 0.0476 | 4.070 | 1.1250 |
| 2 | 0.1302 | 0.0912 | 0.1123 | 0.0786 | 0.0433 | 4.380 | 0.9610 |
| 3 | 0.1374 | 0.0962 | 0.0991 | 0.0694 | 0.0482 | 4.708 | 0.3914 |
| 4 | 0.1513 | 0.1059 | 0.1062 | 0.0743 | 0.0584 | 4.753 | 0.1808 |
| 5 | 0.1225 | 0.0858 | 0.1150 | 0.0805 | 0.0383 | 5.889 | 1.8561 |
| 6 | 0.1174 | 0.0822 | 0.0983 | 0.0688 | 0.0352 | 4.780 | 1.6310 |
| 7 | 0.1419 | 0.0994 | 0.1277 | 0.0894 | 0.0514 | 5.279 | 1.8812 |
| 8 | 0.0954 | 0.0667 | 0.0787 | 0.0551 | 0.0232 | 6.022 | 2.3806 |
| 9 | 0.1401 | 0.0981 | 0.1237 | 0.0866 | 0.0501 | 5.969 | 2.2367 |
| 10 | 0.1309 | 0.0916 | 0.1132 | 0.0792 | 0.0437 | 6.806 | 2.6269 |
| 11 | 0.1531 | 0.1072 | 0.1297 | 0.0908 | 0.0598 | 6.877 | 2.4635 |

Figure 34:
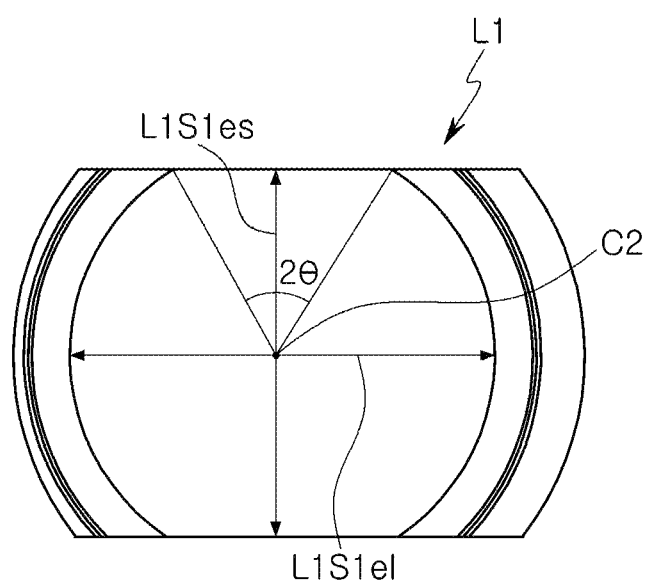
FIG. 34 is a plan view of a first lens according to an example.
Figure 35:
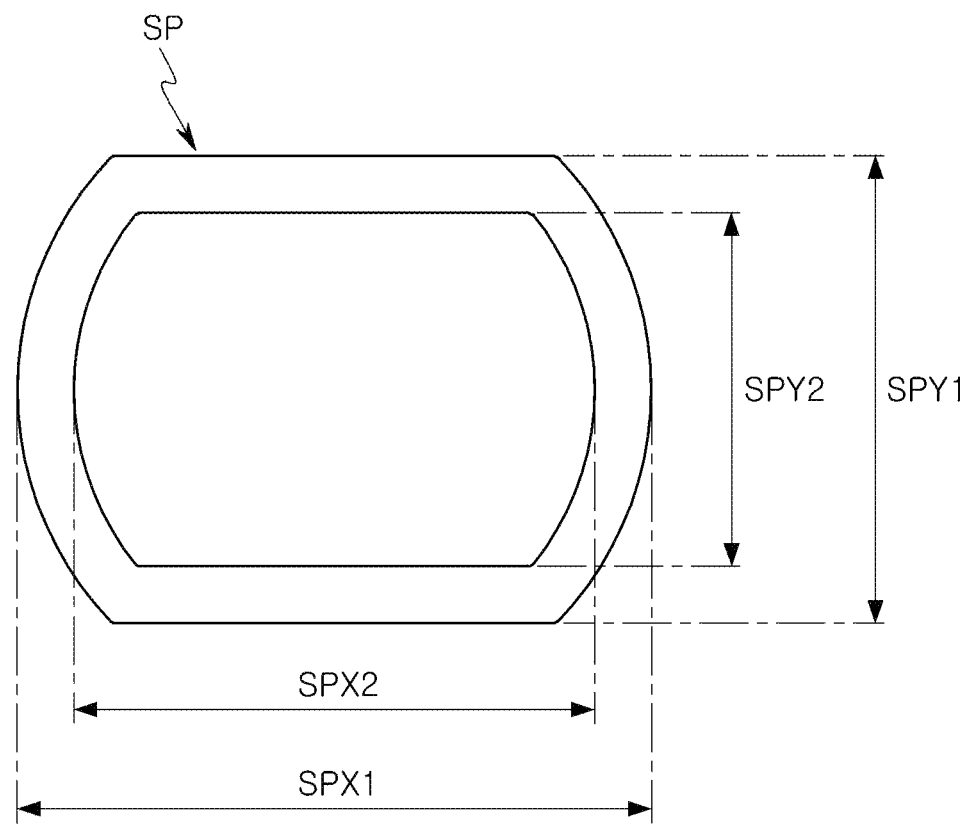
FIG. 35 is a plan view of a gap maintaining member disposed between a first lens and a second lens of an optical imaging system according to an example.

The optical imaging system according to the various examples includes a lens, having a shapes illustrated in FIGS. 34 and 35, and a gap maintaining member. For reference, only a shape of a first lens is illustrated in FIG. 34, but it is noted that second to seventh lenses may also be configured to have shapes illustrated in FIG. 34.

The first lens L1 may be configured to have different lengths in a first direction and a second direction crossing the optical axis. For example, in the first lens L1, an effective radius in the first direction (hereinafter, referred to as a major axis effective radius) L1S1el may be greater than an effective radius in the second direction (hereinafter, referred to as a minor axis effective radius) L1S1es. One surface of the first lens L1 may be formed in a straight-line form. For example, both side surfaces parallel to the major axis effective radius of the first lens L1 may be formed in a straight line, as illustrated in FIG. 34. A range, linearly formed in the first lens L1, may be limited to a predetermined size. For example, an angle 2θ, formed between both an optical axis center C2 and both ends of a linear portion of the first lens L1 may be selected in the range of 10 to 92 degrees.

The gap maintaining member SP may be formed in a substantially rectangular shape, as illustrated in FIG. 35. For example, a length SPX1 of the gap maintaining member SP in the first direction may be greater than a length SPY1 of the gap maintaining member SP in the second direction. Holes of the gap maintaining member SP may be substantially the same or similar in the form of an effective diameter of a lens. A hole of the gap maintaining member SP according to this example may have a pair of straight, parallel lines and a pair of curves, as illustrated in FIG. 35. In the hole of the gap maintaining member SP, a length SPX2 in the first direction may be greater than a length SPY2 in the second direction.

The optical imaging system 20 according to the various examples may be mounted in a small terminal. For example, at least one of the optical imaging systems according to the above-described examples may be mounted on a rear surface or a front surface of a small terminal 10, as illustrated in FIGS. 36 to 39.

Figure 36:
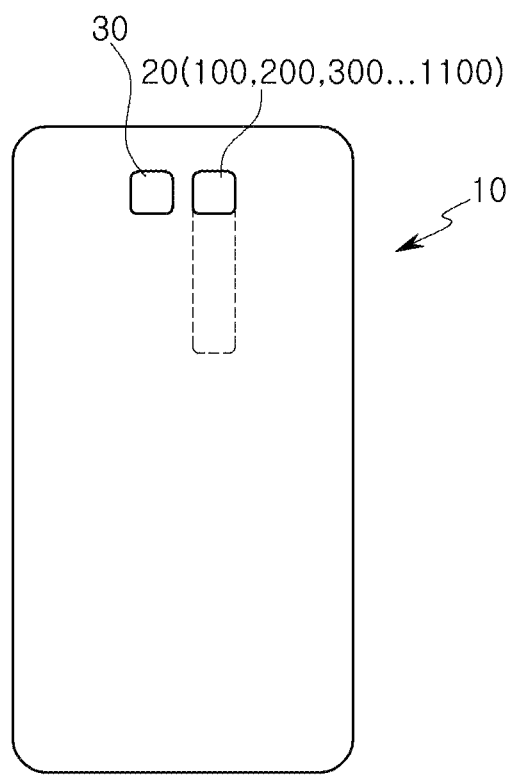
FIGS. 36, 37, 38, and 39 are rear views of a portable terminal in which an optical imaging system according to an example is mounted.
Figure 37:
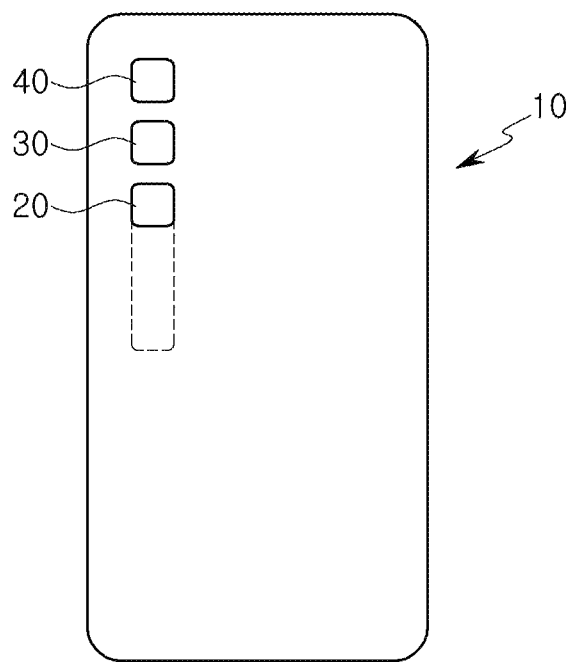
Figure 38:
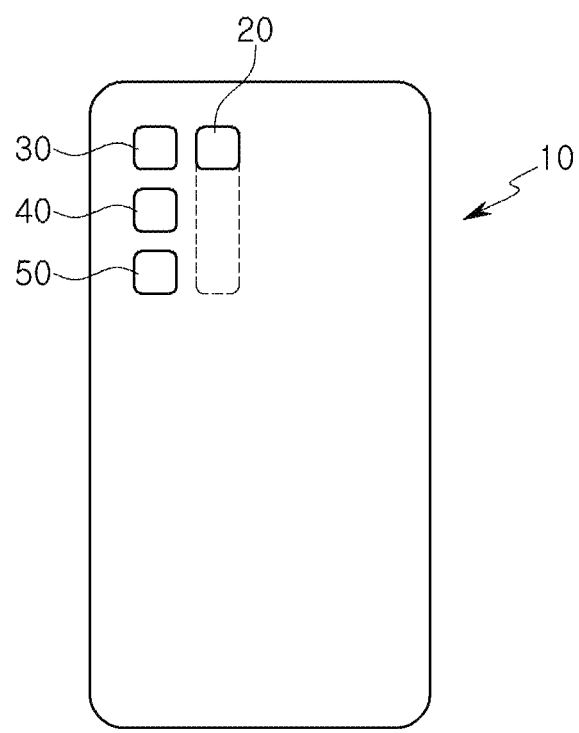
Figure 39:
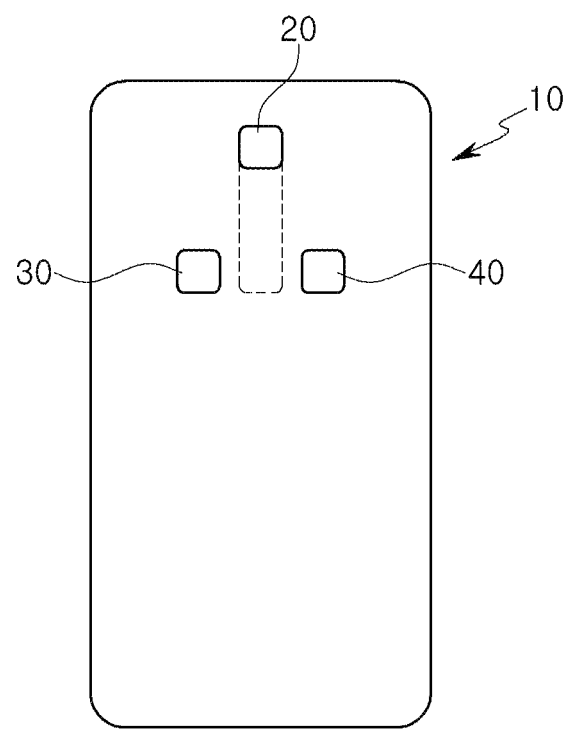

The small terminal 10 may include a plurality of optical imaging systems 20, 30, 40, and 50. As an example, the small terminal 10 may include an optical imaging system 20 for capturing a long distance view and an optical imaging system 30 for capturing a short distance view, as illustrated in FIG. 36. As another example, the small terminal 10 may include an optical imaging system 20 for capturing a long distance view and two optical imaging systems 30 and 40 for capturing a short distance view, as illustrated in FIGS. 37 and 39. As another example, the small terminal 10 may include an optical imaging system 20 for capturing a long distance view and optical imaging systems 30, 40, and 50 having different focal lengths to each other.

An arrangement form of the optical imaging systems 20, 30, 40, and 50 may be variously modified, as illustrated in FIGS. 36 to 39.

As described above, an optical imaging system, which may be mounted in a thinned small-sized terminal while having a long focal length, may be implemented.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens comprising a convex image-side surface, a second lens comprising a concave object-side surface, a third lens, a fourth lens, and a fifth lens disposed sequentially from an object side; and
   a prism disposed on an object side of the first lens,
   wherein $4.8<f/IMG\_HT<9.0$, where f is a focal length of the optical imaging system, and IMG_HT is half a diagonal length of an imaging surface of an image sensor, and
   wherein $1.0<PTTL/f<1.3$, where PTTL is a distance along an optical axis from a reflective surface of the prism to an imaging plane.

2. The optical imaging system of claim 1, wherein $0.04$ mm$<DPL1<1.2$ mm, where DPL1 is a distance from an image-side surface of the prism to an object-side surface of the first lens.

3. The optical imaging system of claim 1, wherein $0.02<AL1/(PTTL)^2<0.07$, where AL1 is an area in which an effective diameter of the first lens is projected onto an imaging plane.

4. The optical imaging system of claim 1, wherein an object-side surface of the third lens is concave.

5. The optical imaging system of claim 1, wherein an object-side surface of the fourth lens is convex.

6. The optical imaging system of claim 1, further comprising:
   a prism disposed between the fifth lens and an imaging plane.

7. A portable electronic device comprising:
   a first camera module, a second camera module, and a third camera module, wherein an optical axis of the first camera module is formed in a different direction from an optical axis of the second camera module and an optical axis of the third camera module,
   wherein the first camera module comprises the optical imaging system of claim 1, and
   wherein the image sensor is configured to convert light incident through the first to fifth lenses to an electrical signal.

8. The portable electronic device of claim 7, wherein the first camera module comprises the narrowest angle of view and the longest focal length, the third camera module comprises the widest angle of view and the shortest focal length, and the second camera module comprises a wider angle of view than the first camera module and a narrower angle of view than the third camera module.

9. An optical imaging system comprising:
   a first prism, a first lens, a second lens, a third lens, a fourth lens, and a fifth lens disposed sequentially from an object side,
   wherein $0.02<AL1/(PTTL)^2<0.07$, where AL1 is an area in which an effective diameter of the first lens is projected onto an imaging plane, and PTTL is a distance along an optical axis from a reflective surface of the first prism to the imaging plane, and
   wherein $1.0<PTTL/f<1.3$, where f is a focal length of the optical imaging sensor.

10. The optical imaging system of claim 9, wherein $4.8<f/IMG\_HT<9.0$, where f is a focal length of the optical imaging system, and IMG_HT is half a diagonal length of an imaging surface of an image sensor.

11. The optical imaging system of claim 9, wherein an image-side surface of the first lens is convex.

12. The optical imaging system of claim 9, wherein an object-side surface of the third lens is concave.

13. The optical imaging system of claim 9, wherein an object-side surface of the fourth lens is convex.

* * * * *